(12) United States Patent
Obayashi

(10) Patent No.: US 10,406,975 B2
(45) Date of Patent: Sep. 10, 2019

(54) STEERING WHEEL STRUCTURE

(71) Applicant: HONDA MOTOR CO., LTD, Tokyo (JP)

(72) Inventor: Yuya Obayashi, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 128 days.

(21) Appl. No.: 15/323,540

(22) PCT Filed: May 29, 2015

(86) PCT No.: PCT/JP2015/065582
§ 371 (c)(1),
(2) Date: Jan. 3, 2017

(87) PCT Pub. No.: WO2016/042850
PCT Pub. Date: Mar. 24, 2016

(65) Prior Publication Data
US 2017/0144594 A1  May 25, 2017

(30) Foreign Application Priority Data

Sep. 19, 2014 (JP) ................................. 2014-191016

(51) Int. Cl.
*B60Q 5/00* (2006.01)
*B62D 1/04* (2006.01)
(Continued)

(52) U.S. Cl.
CPC ............ *B60Q 5/003* (2013.01); *B60R 21/203* (2013.01); *B62D 1/04* (2013.01); *B62D 7/222* (2013.01);
(Continued)

(58) Field of Classification Search
CPC ... B60Q 5/003; B60R 21/203; B60R 21/2037; B62D 1/04; B62D 1/046; B62D 7/222; H01H 13/14
See application file for complete search history.

(56) References Cited

U.S. PATENT DOCUMENTS 9,120,453 B2 * 9/2015 Obayashi ............... B62D 7/222
2006/0197323 A1 9/2006 Pillsbury et al.
(Continued)

FOREIGN PATENT DOCUMENTS

JP 2011-169416 A 9/2011
JP 2012-254790 A 12/2012
(Continued)

OTHER PUBLICATIONS

Office Action dated Dec. 5, 2017, issued in counterpart Japanese Application No. 2016-548585, with English anslation. (9 pages).
(Continued)

*Primary Examiner* — Thomas C Diaz
(74) *Attorney, Agent, or Firm* — Westerman, Hattori, Daniels & Adrian, LLP

(57) ABSTRACT

A steering wheel structure includes: a steering wheel main body supported by a steering shaft; a horn block to which a horn operation unit and an air-bag module are attached; and a connection unit that connects the horn block to the steering wheel main body such that the horn block can be elastically displaced with respect to the steering wheel main body, wherein the connection unit includes a support pin having one end supported by any one of the horn block and the steering wheel main body, a cylinder component having an outer circumferential part attached to the other of the horn block and the steering wheel main body, and an elastic
(Continued)

component arranged between the cylinder component and the support pin, and wherein the elastic component is fixed to the cylinder component.

2 Claims, 20 Drawing Sheets

(51) Int. Cl.
*B60R 21/203* (2006.01)
*H01H 13/14* (2006.01)
*B62D 7/22* (2006.01)

(52) U.S. Cl.
CPC ......... *H01H 13/14* (2013.01); *B60R 21/2037* (2013.01); *H01H 2231/026* (2013.01); *H01H 2235/01* (2013.01)

(56) References Cited

U.S. PATENT DOCUMENTS

2009/0218739 A1    9/2009  Terada et al.
2012/0169032 A1    7/2012  Sasaki et al.
2013/0221641 A1    8/2013  Kondo et al.
2013/0239739 A1    9/2013  Miyahara et al.
2014/0131982 A1    5/2014  Ishii et al.
2014/0306432 A1   10/2014  Obayashi et al.

FOREIGN PATENT DOCUMENTS

| JP | 2014-54991 A   | 3/2014 |
| JP | 2014-111426 A  | 6/2014 |
| JP | 5523996 B2     | 6/2014 |
| JP | 2014-141255 A  | 8/2014 |
| WO | 20131077215 A1 | 5/2013 |

OTHER PUBLICATIONS

International Search Report dated Jul. 7, 2015, issued in counterpart International Application No. PCT/JP2015/065582, w/English translation (4 pages).

* cited by examiner

STEERING WHEEL STRUCTURE

TECHNICAL FIELD

The present invention relates to a steering wheel structure in which an air-bag module is integrally attached to a horn operation unit.

BACKGROUND

In most air-bag apparatuses provided on a driver's seat side, an air-bag module is integrally attached to the inside of a horn operation unit of a steering wheel. In this case, a horn block to which the horn operation unit and the air-bag module are integrally attached is attached by a support pin made of a metal to a steering wheel main body supported by a steering shaft.

As this kind of steering wheel structure, a structure is known in which one end part of a support pin is locked to any one of a horn block and a steering wheel main body, a rubbery elastic component is interposed between the other of the horn block and the steering wheel main body and the other end part of the support pin, and according to the mass of the horn block and the elastic component, a dynamic damper for suppressing the vibration of the steering wheel is formed (for example, refer to Patent Document 1).

In the steering wheel structure described in Patent Document 1, a connection unit that connects a horn block to a steering wheel main body includes a support pin having one end part that is locked to the horn block; a rubbery elastic component; and inner and outer members made of a resin held by the support pin in a state where the elastic component is sandwiched. The inner member is supported by the horn block via a coil spring, and the outer member is connected to the steering wheel main body.

In the steering wheel structure, the elastic component sandwiched by the inner member and the outer member made of a resin functions as a spring of a dynamic damper, and the horn block is caused to resonate with vehicle vibration to thereby attenuate the vibration of the steering wheel. Further, in the steering wheel structure, the elastic component is not directly attached to a metal member on the steering wheel main body side but is locked to the steering wheel main body side via the outer member made of a resin, and therefore, it is possible to prevent the elastic member from coming into contact directly with the metal member and being worn early.

RELATED ART DOCUMENTS

Patent Documents

[Patent Document 1] Japanese Patent No. 5523996

SUMMARY OF INVENTION

Problems to be Solved by the Invention

However, in the steering wheel structure of the related art described above, since the elastic component that functions as the spring of the dynamic damper is used in a state where the elastic component is merely sandwiched by the inner member and the outer member, an unpredictable transmission loss of vibration increases while the vibration is transmitted to the elastic component, and it is difficult to set the property such as an attenuation frequency of the dynamic damper with high accuracy.

A problem to be solved is to set the property of the dynamic damper with high accuracy.

Means for Solving the Problem

An aspect of the present invention is a steering wheel structure including: a steering wheel main body supported by a steering shaft; a horn block to which a horn operation unit and an air-bag module are attached; and a connection unit that connects the horn block to the steering wheel main body such that the horn block can be elastically displaced with respect to the steering wheel main body, wherein the connection unit includes a support pin having one end supported by any one of the horn block and the steering wheel main body, a cylinder component having an outer circumferential part attached to the other of the horn block and the steering wheel main body, and an elastic component arranged between the cylinder component and the support pin, and wherein the elastic component is fixed to the cylinder component.

Thereby, when vehicle vibration is input via the steering shaft to the steering wheel main body, the horn block resonates such that the elastic component fixed to the cylinder component is a spring. At this time, the elastic component and the cylinder component are fixed to each other, and therefore, the transmission efficiency of the vibration is enhanced. Further, the elastic component is not directly fixed to the other of the horn block and the steering wheel main body but is fixed, via the cylinder component fixed to the elastic component fixed, to the other of the horn block and the steering wheel main body. Therefore, early degradation of the elastic component is prevented.

An aspect of the present invention is characterized in that the elastic component is fixed to the cylinder component and the support pin.

In this case, the cylinder component and the elastic component are fixed to each other, and the elastic component and the support pin are fixed to each other. Therefore, the transmission efficiency of the vibration is further enhanced.

An aspect of the present invention is characterized in that the support pin has a shaft part and a head part provided at one end of the shaft part and having a larger diameter than the shaft part, and the elastic component is fixed to the head part in a non-contact state with the shaft part of the support pin.

In this case, a gap is formed between the circumferential area of the shaft part of the support pin and the elastic component, and the elastic component is easily vibrated further flexibly when the vehicle vibration is input. Accordingly, it is possible to further improve the attenuation performance of the dynamic damper.

An aspect of the present invention is characterized in that the elastic component has a circumferential wall part that is fixed to an inside of the cylinder component and a beam part that is fixed to the support pin and extends radially outward to be connected to the circumferential wall part.

In this case, around the circumferential wall part of the elastic component, the vibration property such as a resonation frequency is changed between a section where the beam part is present and a section where the beam part is absent. Therefore, by considering the position of the beam part when provided at the steering wheel, it is possible to obtain a property advantageous for attenuation corresponding to the input direction of vibration as an attenuation target.

An aspect of the present invention is characterized in that the elastic component has an inner circumferential wall part that is connected to the beam part and is fixed to an outer circumferential surface of the shaft part of the support pin.

In this case, the beam part of the elastic component is rigidly and stably fixed to the shaft part of the support pin via the inner circumferential wall part.

An aspect of the present invention is characterized in that the elastic component is provided to extend at a region where at least the cylinder component and the shaft part of the support pin axially overlap with each other.

In this case, even when a large load is input diagonally to the horn block when the horn is operated or the like, it is possible to prevent the cylinder component from coming into contact with the shaft part of the support pin and generating an abnormal sound.

An aspect of the present invention is characterized in that the support pin is fixed to any one of the horn block and the steering wheel main body, the connection unit further includes a guide component having a cylinder shape and slidably held by the support pin, and the elastic component is fixed to the cylinder component and the guide component.

In this case, when the horn is operated or the like, the support pin is not displaced in accordance with the displacement of the horn block, and the guide component slides on the support pin.

An aspect of the present invention is characterized in that the elastic component has a circumferential wall part that is fixed to an inside of the cylinder component and a beam part that is fixed to the guide component and extends radially outward to be connected to the circumferential wall part.

In this case, around the circumferential wall part of the elastic component, the vibration property such as a resonation frequency is changed between a section where the beam part is present and a section where the beam part is absent. Therefore, by considering the position of the beam part when provided at the steering wheel, it is possible to obtain a property advantageous for attenuation corresponding to the input direction of vibration as an attenuation target.

An aspect of the present invention is characterized in that the elastic component has an inner circumferential wall part that is connected to the beam part and is fixed to an outer circumferential surface of a cylinder part of the guide component.

In this case, the beam part of the elastic component is rigidly and stably fixed to the cylinder part of the guide component via the inner circumferential wall part.

An aspect of the present invention is characterized in that the guide component has a cylinder part and a flange part that projects radially outward from one end in an axis direction of the cylinder part, and the elastic component is fixed to the flange part in a non-contact state with the cylinder part of the guide component.

In this case, a gap is formed between the circumferential area of the cylinder part of the guide component and the elastic component, and the elastic component is easily vibrated further flexibly when the vehicle vibration is input. Accordingly, it is possible to further improve the attenuation performance of the dynamic damper.

An aspect of the present invention is characterized in that the elastic component is provided to extend at a region where at least the cylinder component and the cylinder part of the guide component axially overlap with each other.

In this case, even when a large load is input diagonally to the horn block when the horn is operated or the like, it is possible to prevent the cylinder component from coming into contact with the guide component and generating an abnormal sound.

An aspect of the present invention is characterized in that the support pin is fixed to any one of the horn block and the steering wheel main body, the connection unit further includes a guide component having a cylinder shape and slidably held by the support pin, and one end part in an axis direction of the elastic component is fixed to the cylinder component and the other end part in the axis direction of the elastic component is fixed to the guide component or is pressed to be in contact with the guide component in use.

In this case, when the horn is operated or the like, the support pin is not displaced in accordance with the displacement of the horn block, and the guide component slides on the support pin. Further, the one end part in the axis direction of the elastic component is integrated with the cylinder component, and the other end part in the axis direction of the elastic component is displaced integrally with the guide component at least in use.

An aspect of the present invention is characterized in that a bias spring that is arranged between the guide component and any one of the horn block and the steering wheel main body and biases the horn block toward an initial position is provided, the support pin has a regulation part that regulates a displacement in the initial position direction of the guide component, and the guide component has a load reception flange part having a first surface which is directed in one of the axis direction and to which the elastic component is fixed or with which the elastic component is pressed to be in contact in use and a second surface which is directed in the other of the axis direction and which receives a bias load of the bias spring.

In this case, the bias load of the bias spring directed to the initial position direction works on the guide component, and the displacement in the initial position direction of the guide component is regulated by the regulation part on the support pin.

An aspect of the present invention is characterized in that the elastic component includes an extension part which is joined to the first surface of the load reception flange part and which is fixed to a region facing the regulation part or is pressed to be in contact with the region facing the regulation part in use.

In this case, the regulation part on the support pin comes into contact with the load reception flange part of the guide component via the extension part of the elastic component. Thereby, an impact or a contact sound when the guide component is regulated by the regulation part is absorbed by the extension part of the elastic component. Accordingly, by adopting this configuration, it is possible to suppress a noise or vibration generated when the guide component is regulated by the regulation part.

An aspect of the present invention is characterized in that a contact member that comes into contact directly with any one of the horn block and the steering wheel main body is attached to one end of the support pin, a support hole with which the contact member comes into contact and by which the contact member is supported is provided on any one of the horn block and the steering wheel main body, and a taper part that comes into contact with an inner surface of the support hole when the support pin is fixed to any one of the horn block and the steering wheel main body is provided on the contact member.

In this case, when the one end of the support pin is fixed to any one of the horn block and the steering wheel main body, the taper part of the contact member attached to the one end of the support pin comes into contact with the inner surface of the support hole, and thereby, the support pin is positioned with respect to any one of the horn block and the steering wheel main body. Further, even when the support pin may receive an external force and be slightly fluctuated in the axis direction, the taper part comes into contact with the inner surface of the support hole, and thereby, the support pin is automatically returned to the appropriate position.

Advantage of the Invention

According to an aspect of the present invention, since the elastic component that functions as the spring of the dynamic damper is fixed to the cylinder component, a transmission loss of vibration around the elastic component is decreased, and as a result, it is possible to set the property, such as an attenuation frequency of the dynamic damper, with high accuracy.

DESCRIPTION OF THE EMBODIMENTS

Figure 1:
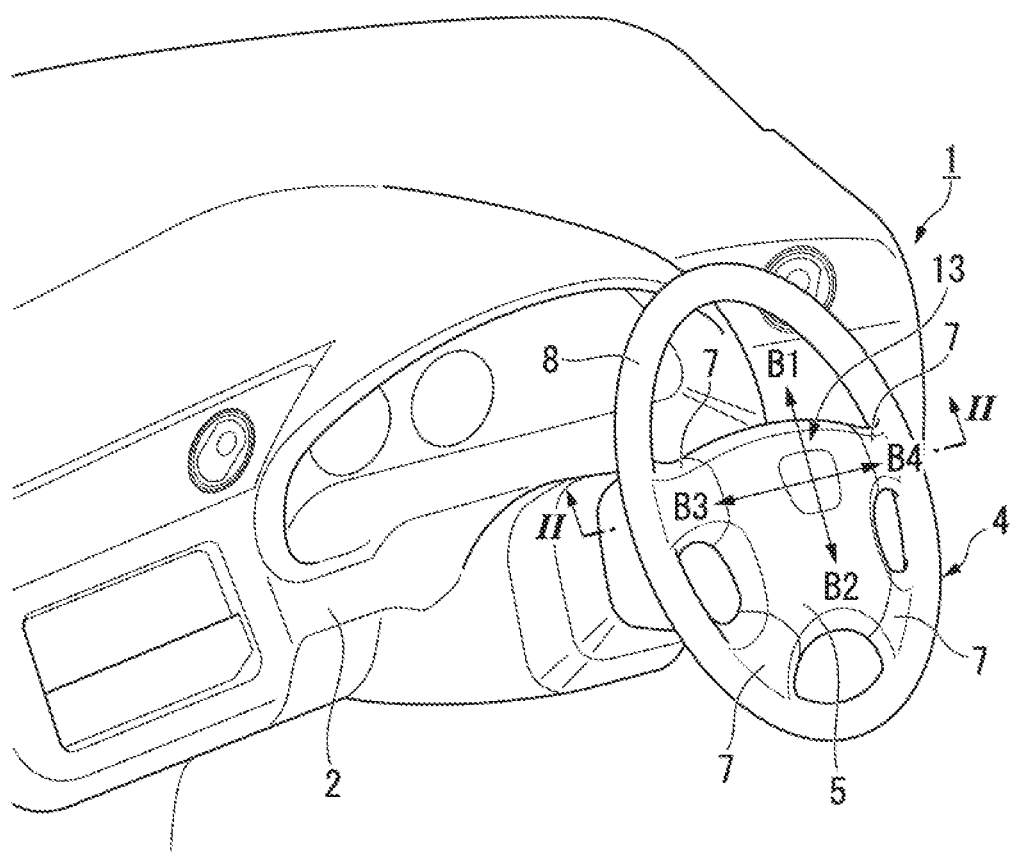
FIG. 1 is a perspective view showing a vehicle interior according to an embodiment of the present invention.

Hereinafter, embodiments of the invention will be described based on the drawings.

In the following description, the extension direction of a steering shaft 3 indicated by an arrow A direction in the drawing is defined as an "axis direction". The directions orthogonal to the longitudinal direction of the steering shaft 3 indicated by arrows B, B1 to B4 directions in the drawing are defined as an "axis orthogonal direction". In the embodiments, a mutual part is given by the same reference numeral, and a redundant description is omitted.

First, a first embodiment shown in FIG. 1 to FIG. 8 is described.

Figure 2:
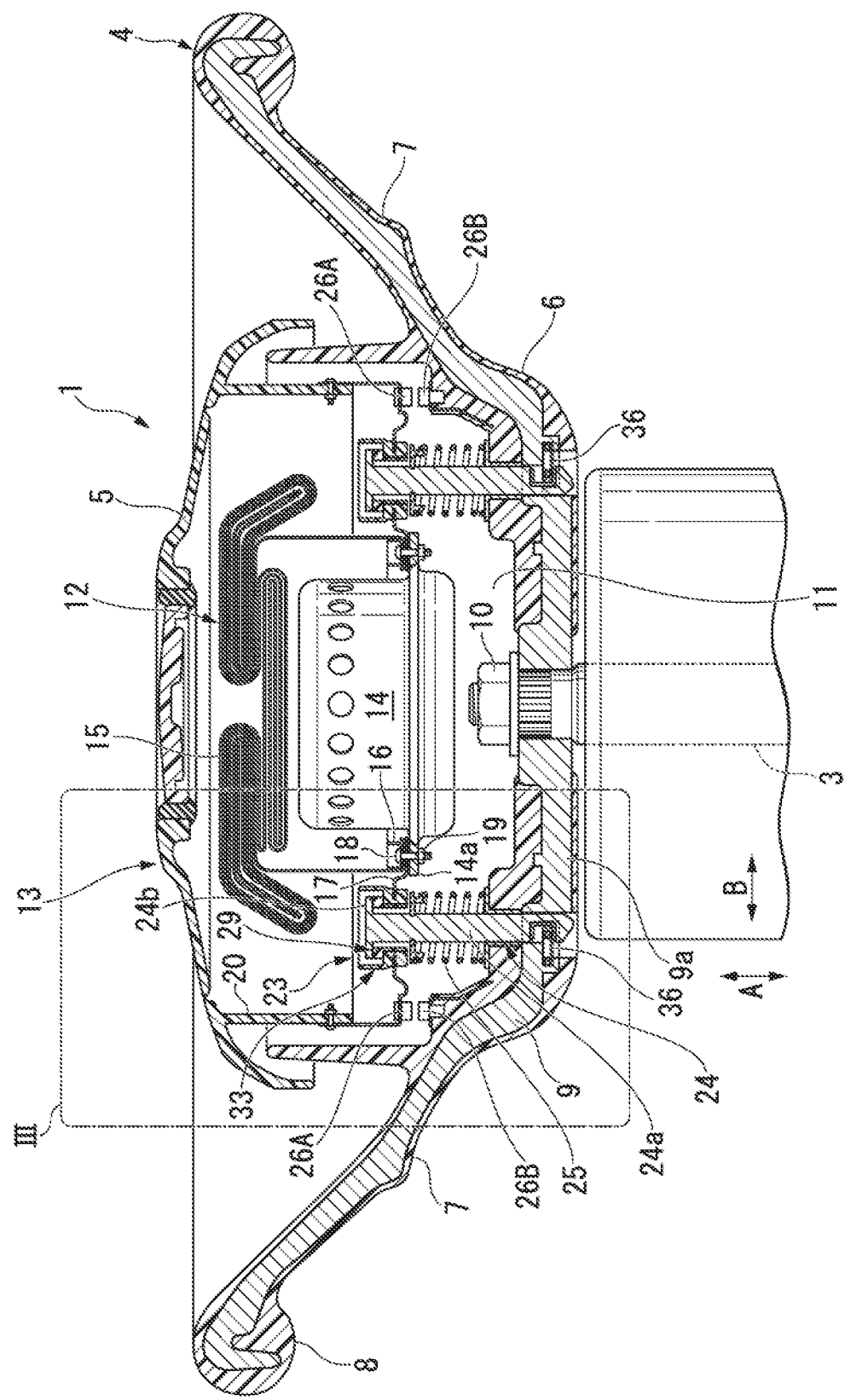
FIG. 2 is a cross-sectional view cut at a II-II line of FIG. 1 of a steering wheel according to a first embodiment of the present invention.
Figure 3:
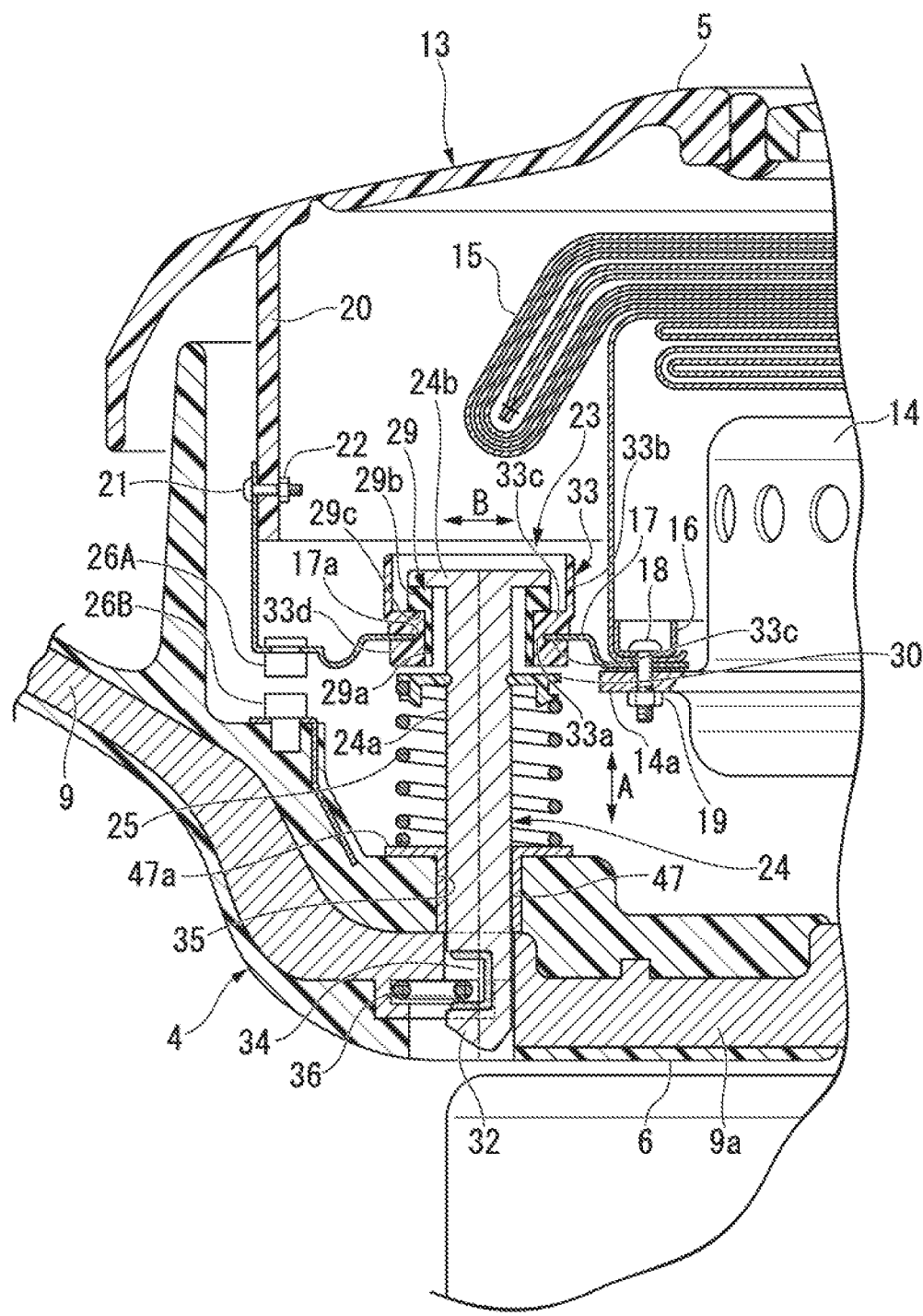
FIG. 3 is an enlarged view of a III part of FIG. 2 of the steering wheel according to the first embodiment of the present invention.

FIG. 1 is a view showing a driver's seat of a vehicle interior according to the first embodiment. FIG. 2 is a cross-sectional view of a steering wheel 1 corresponding to a II-II cross section of the driver's seat of FIG. 1. FIG. 3 is an enlarged view of part of FIG. 2.

As shown in the figures, in the steering wheel 1, a steering wheel main body 4 that is gripped by a driver is attached to a front end part of the steering shaft 3 that protrudes rearward toward the inside of the vehicle interior from an instrument panel 2, and a steering pad 5 which is a horn operation unit is arranged at a center region of the steering wheel main body 4.

The steering wheel main body 4 includes a cover unit 6 (refer to FIG. 2, FIG. 3) at the center part, a plurality of spoke units 7 that extend radially outward from the circumference of the cover unit 6, and a rim unit 8 that has an annular shape and is joined to extension ends of the plurality of spoke units 7. A core metal 9 is embedded in the inside of each of the cover unit 6, the spoke unit 7, and the rim unit 8, and the outside of the core metal 9 is covered by a synthetic resin. A boss part 9*a* of the core metal 9 embedded in the cover unit 6 is fitted to the front end of the steering shaft 3 and is fastened to be fixed by a nut 10 to the steering shaft 3.

A recess space 11 that is recessed toward the vehicle body frontward direction is provided between the cover unit 6 at the center part of the steering wheel main body 4 and the rim unit 8 at the outer circumferential part, and a horn block 13 that integrates an air-bag module 12 and the steering pad 5 is arranged in the recess space 11.

As shown in FIG. 2 and FIG. 3, the air-bag module 12 includes an inflator 14 that generates a high-pressure gas, an air-bag 15 that is arranged rearward (vehicle interior side) of the inflator 14 in a state of being folded, and a first retainer 16 and a second retainer 17 that interpose an opening part of the air-bag 15. An opening edge of the air-bag 15 is fastened to be fixed by a bolt 18 and a nut 19 to a flange part 14*a* at the circumference of the inflator 14 together with the first and second retainers 16, 17 in a state of being vertically sandwiched by the first retainer 16 and the second retainer 17.

The rear surface (vehicle interior side surface) of the air-bag module 12 is covered by the steering pad 5 which is the horn operation unit. A connection wall 20 is provided to protrude frontward from an outer circumferential edge part of the steering pad 5 and is fastened to be fixed by a bolt 21 and a nut 22 to an outer circumferential edge part of the second retainer 17. In this way, the horn block 13 that is formed by integrating the air-bag module 12 and the steering pad 5 is locked in a floating state to the core metal 9 of the steering wheel main body 4 by three connection units 23.

In the case of the embodiment, two of the connection units 23 are provided at right and left positions of an upper part of the steering shaft 3, and one of the connection units 23 is provided at a center position of a lower part of the steering shaft 3. All the connection units 23 have the same structure. In FIG. 2, two of the connection units 23 at right and left positions of the upper part of the steering shaft 3 are shown.

Figure 4:
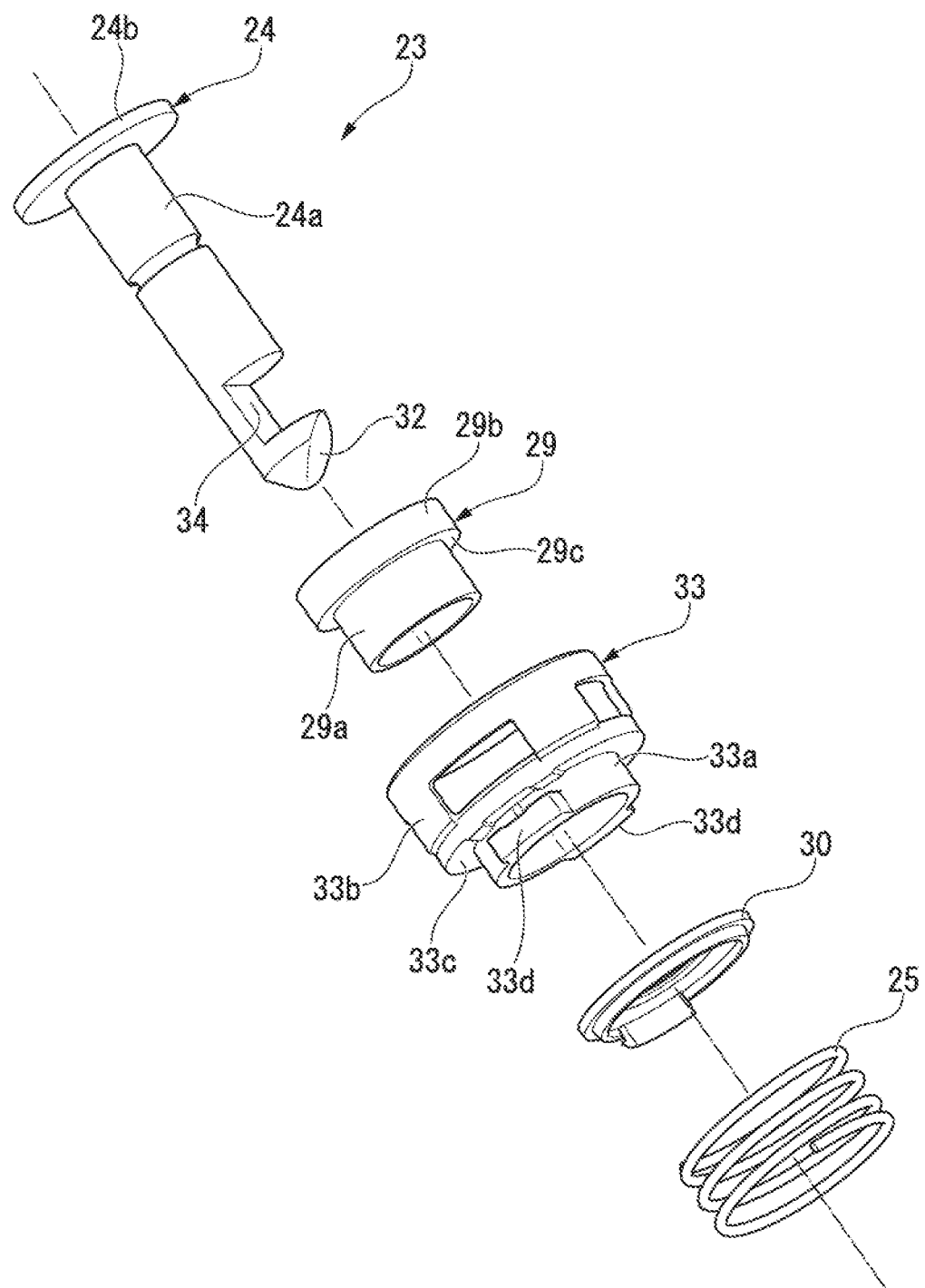
FIG. 4 is an exploded perspective view of a connection unit and an addition component according to the first embodiment of the present invention.
Figure 5:
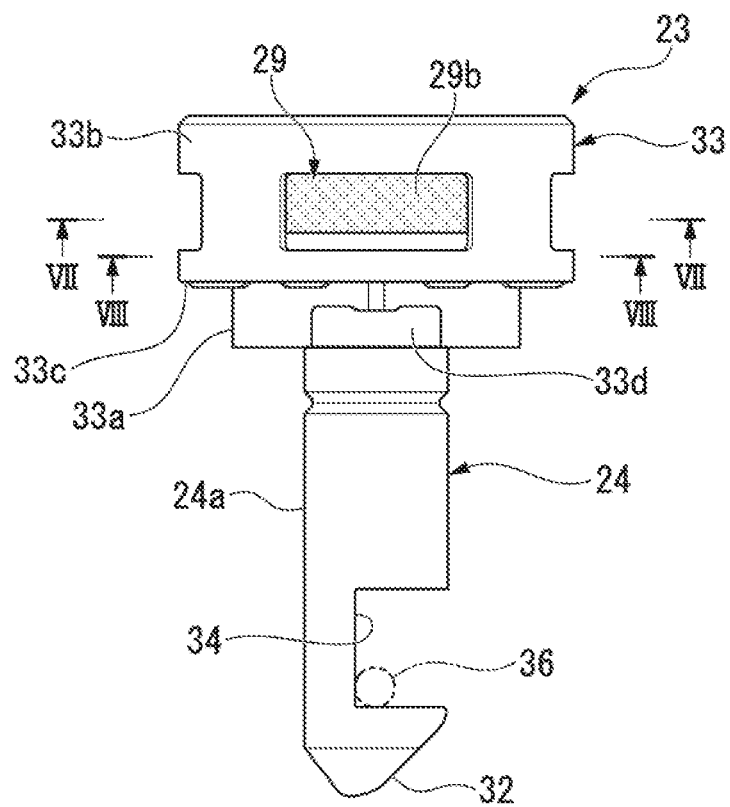
FIG. 5 is a side view of the connection unit according to the first embodiment of the present invention.
Figure 6:
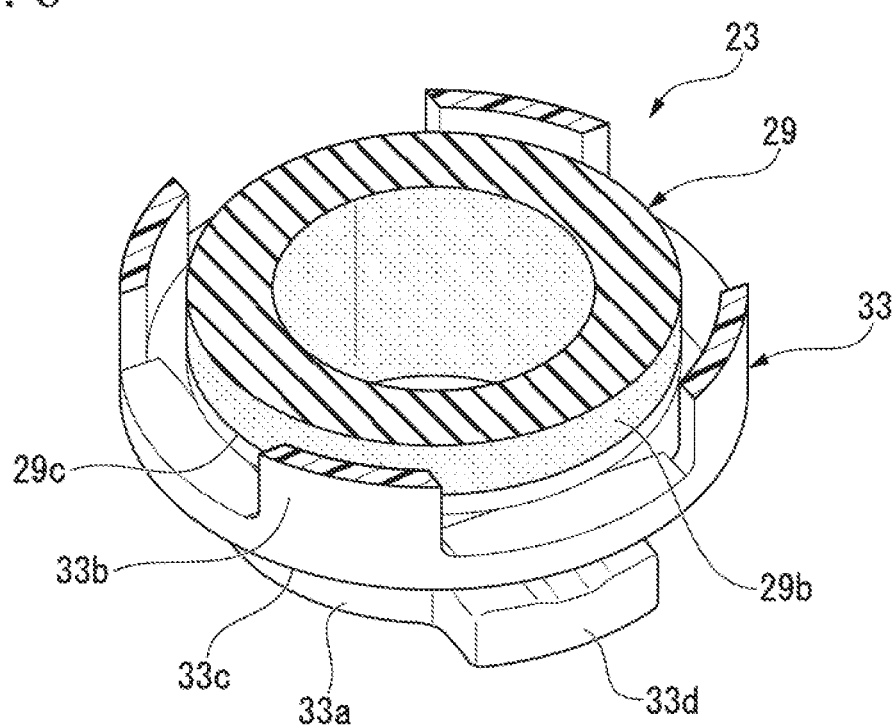
FIG. 6 is a perspective view broken at a VII-VII line of FIG. 5 of the connection unit according to the first embodiment of the present invention.
Figure 7:
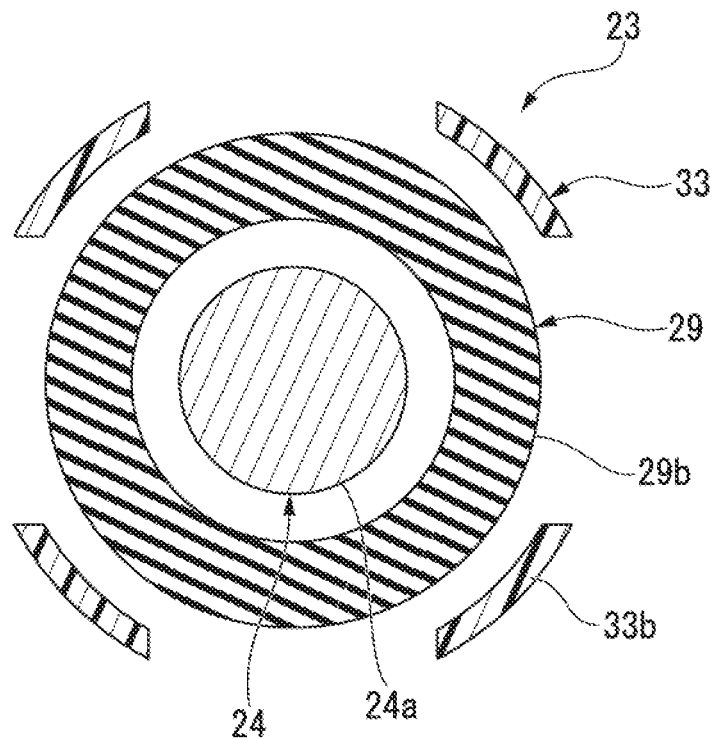
FIG. 7 is a cross-sectional view cut at the VII-VII line of FIG. 5 of the connection unit according to the first embodiment of the present invention.
Figure 8:
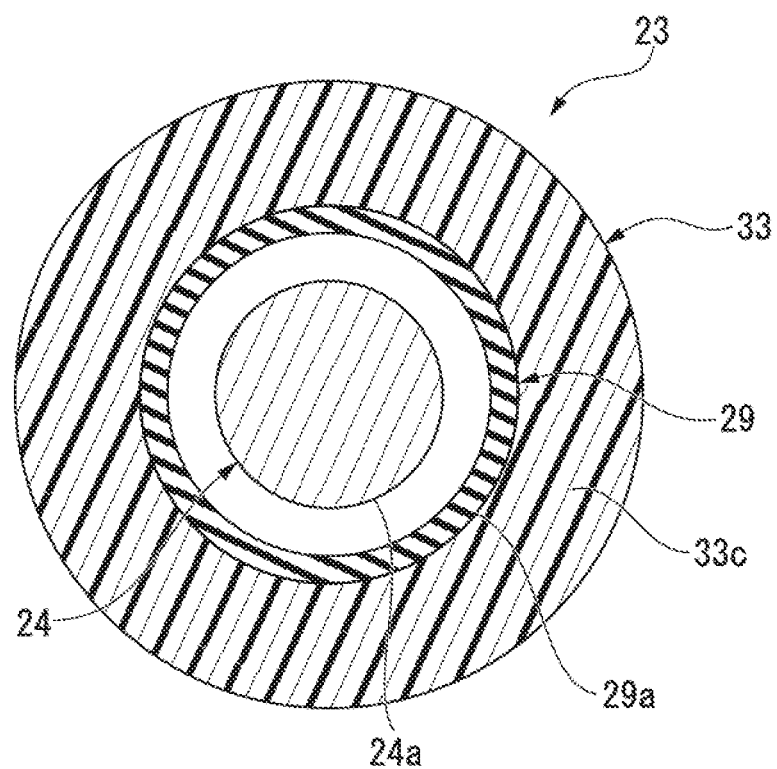
FIG. 8 is a cross-sectional view cut at a VIII-VIII line of FIG. 5 of the connection unit according to the first embodiment of the present invention.
Figure 9:
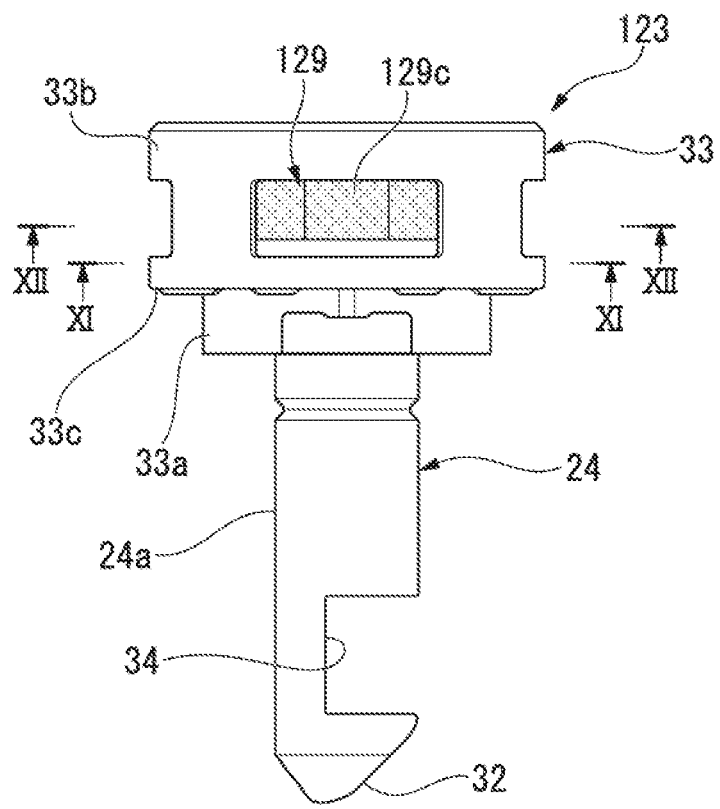
FIG. 9 is a side view of a connection unit according to a second embodiment of the present invention.
Figure 10:
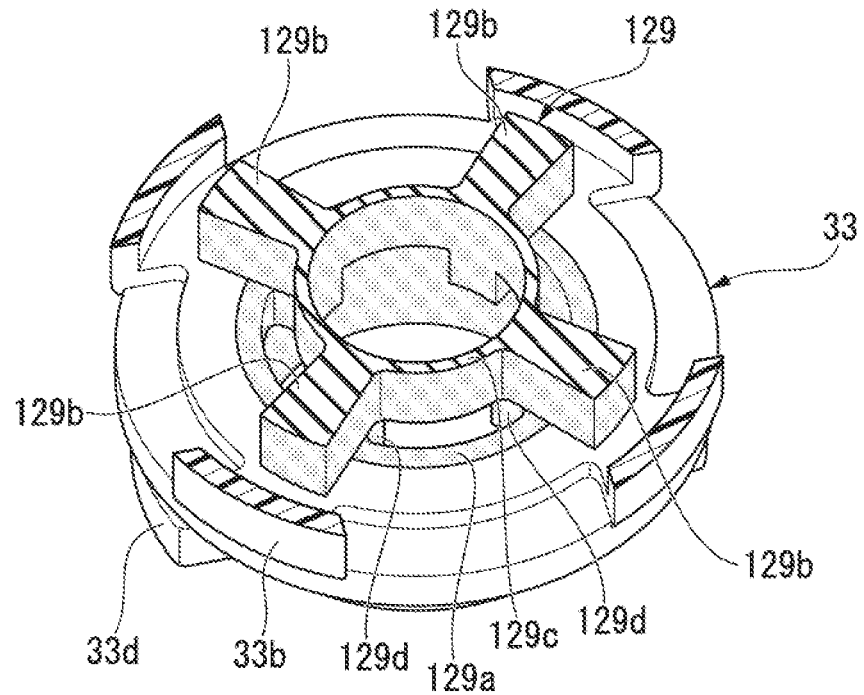
FIG. 10 is a perspective view broken at a XII-XII line of FIG. 9 of the connection unit according to the second embodiment of the present invention.
Figure 11:
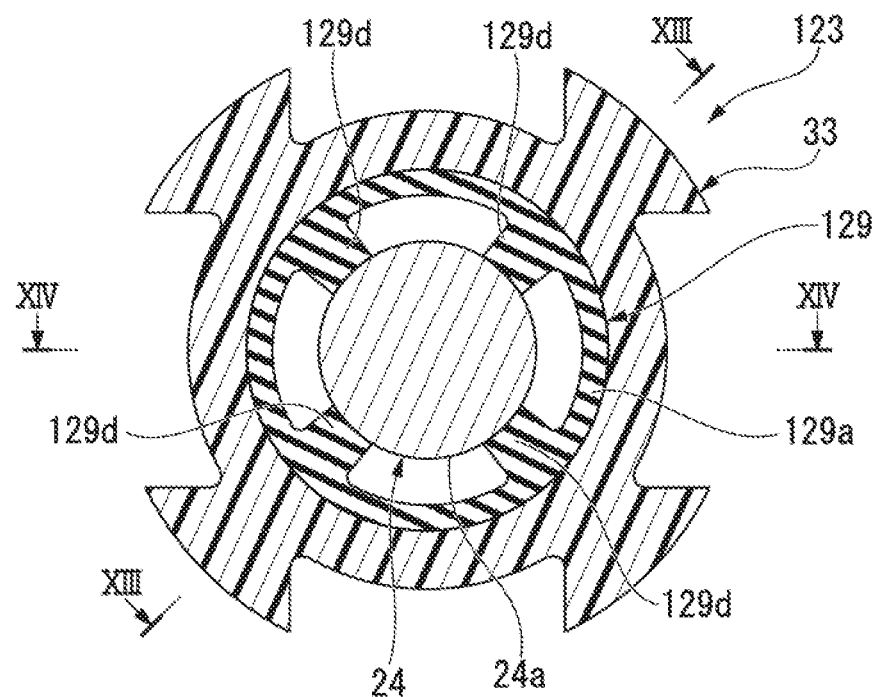
FIG. 11 is a cross-sectional view cut at a XI-XI line of FIG. 9 of the connection unit according to the second embodiment of the present invention.
Figure 12:
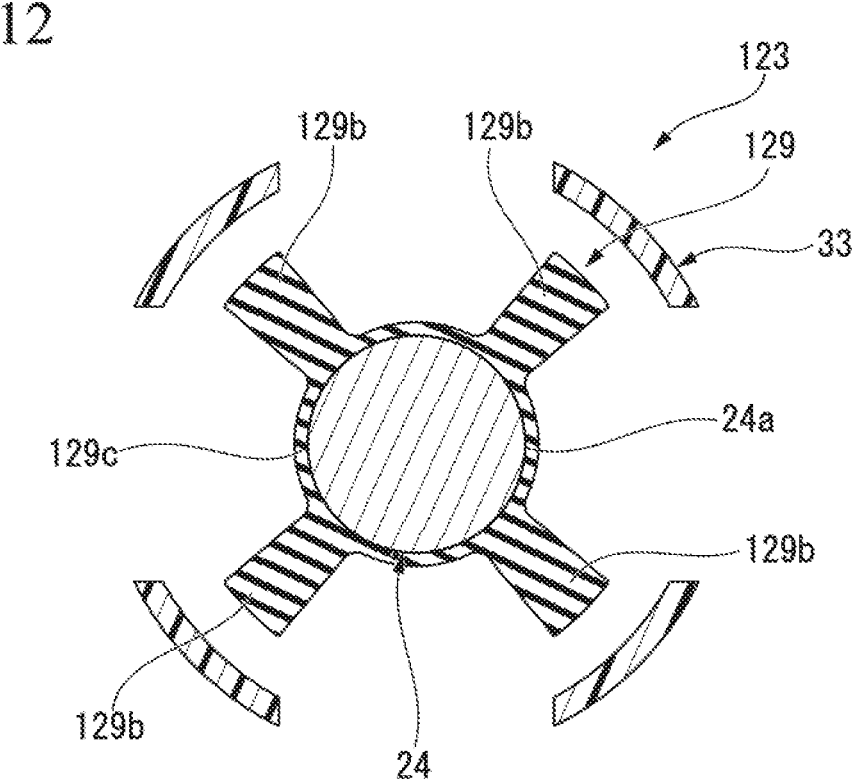
FIG. 12 is a cross-sectional view cut at the XII-XII line of FIG. 9 of the connection unit according to the second embodiment of the present invention.
Figure 13:
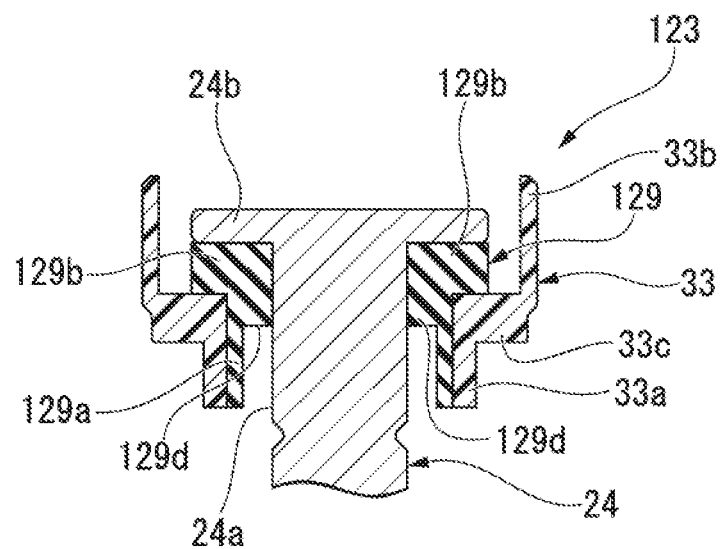
FIG. 13 is a cross-sectional view cut at a XIII-XIII line of FIG. 11 of the connection unit according to the second embodiment of the present invention.
Figure 14:
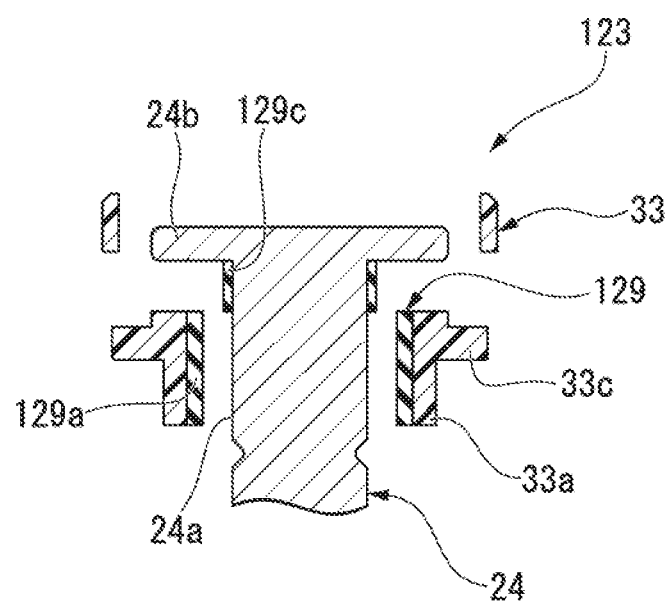
FIG. 14 is a cross-sectional view cut at a XIV-XIV line of FIG. 11 of the connection unit according to the second embodiment of the present invention.

FIG. 4 is an exploded perspective view of the connection unit 23 and an addition component. FIG. 5 is a side view of the connection unit 23. FIG. 6 is a perspective view broken at part of the connection unit 23. FIG. 7 and FIG. 8 are cross-sectional views of the connection unit 23.

The connection unit 23 includes a support pin 24 having one end supported by the steering wheel main body 4, an outer collar 33 which is a cylinder component made of a resin and has an outer circumferential part attached to the horn block 13, and an elastic component 29 formed of a rubber, an elastic resin, or the like interposed between the outer collar 33 and the support pin 24. The elastic component 29 is, for example, formed of a rubber such as an EPDM. The elastic component 29 forms a spring of a dynamic damper in which the horn block 13 is a damper mass. The support pin 24 is, for example, formed of a metal such as a stainless steel.

A spring retainer 30 is attached integrally to the support pin 24 at a substantially center position in the axis direction. A horn spring 25 that biases the horn block 13 in the initial position direction (direction away from the cover unit 6) is interposed between the spring retainer 30 and the cover unit 6 of the steering wheel main body 4. One end part (vehicle body front side) of the support pin 24 is retained in a state where a slight axis direction displacement is allowed by the cover unit 6 of the steering wheel main body 4, and the other end part (part positioned on the vehicle body rear side) is locked to be fixed to the second retainer 17 of the horn block 13 via the elastic component 29 and the outer collar 33. A taper part 32 having a decreased diameter toward the extension end is formed at one end part in the axis direction of the support pin 24, and a head part 24*b* having a circular plate shape and having a larger diameter than a shaft part 24*a* is formed at the other end in the axis direction of the support pin 24.

A pair of horn contact points 26A, 26B that forms a horn switch is attached at positions facing each other in the axis direction of the second retainer 17 of the horn block 13 and the cover unit 6 of the steering wheel main body 4. The horn contact points 26A. 26B are in a separated state (non-contact state) when the horn block 13 is biased by the horn sprint 25 to be positioned in the vicinity of the initial position. When the horn block 13 is operated to be pressed by a set stroke or more from the state, the horn contact points 26A, 26B come into contact with each other to operate the horn.

A cutout groove 34 recessed in an axis perpendicular direction is formed at a part of the outer circumferential surface close to one end part of the support pin 24, the part being adjacent to the enlarged diameter side of the taper part 32. As shown in FIG. 3, a support hole 35 to which one end part of the support pin 24 is inserted is formed at the cover unit 6 of the steering wheel main body 4. A locking member 36 formed of a spring steel wire is arranged at a region facing the support hole 35 of the front surface (surface on the vehicle body front side) of the cover unit 6. The locking member 36 is engaged with spring elasticity to the cutout groove 34 of the support pin 24 that penetrates through the support hole 35. The groove width (width in a direction along the axis direction of the support hole 35) of the cutout groove 34 is formed to be larger by a set width than the outer diameter of the locking member 36. The displacement along the axis direction of the support pin 24 with respect to the cover unit 6 is allowed by the difference between the groove width of the cutout groove 34 and the outer diameter of the locking member 36.

A guide bush 47 is pressed into the support hole 35 of the cover unit 6 from a part (vehicle body rear side) facing the recess space 11. One end part of the support pin 24 is slidably guided by the guide bush 47. In the guide bush 47, a flange part 47*a* that protrudes radially outward is formed at one end of a cylinder part having a cylinder shape. The flange part 47*a* comes into contact with the opening edge part of the part facing the recess space 11 of the support hole 35 of the cover unit 6.

The elastic component 29 is formed such that the entire shape is a cylinder shape. A large diameter cylinder part 29*b* having a larger outer diameter than that of a general cylinder part 29*a* is provided to continue to one end part in the axis direction of the general cylinder part 29*a* having a constant outer diameter. A step surface 29*c* perpendicular to outer circumferential surfaces of the general cylinder part 29*a* and the large diameter cylinder part 29*b* is provided between the outer circumferential surfaces of the general cylinder part 29*a* and the large diameter cylinder part 29*b*. The inner circumferential surface of the elastic component 29 is formed to have a constant inner diameter over the entire area in the axis direction.

In the outer collar 33 made of a resin, a large diameter cylinder part 33*b* is provided to continue via a step part 33*c* to one end part in the axis direction of a small diameter cylinder part 33*a*. The small diameter cylinder part 33*a* is fitted into an attachment hole 17a provided at the second retainer 17 on the horn block 13 side from the front surface part (vehicle body rear side) of the second retainer 17. A locking flange 33d that sandwiches the edge part of the attachment hole 17a together with the step part 33c and locks the outer collar 33 to be fixed to the second retainer 17 in a state where the small diameter cylinder part 33a is fitted in the attachment hole 17a is provided to protrude at the small diameter cylinder part 33a.

The elastic component 29 interposed between the support pin 24 and the outer collar 33 is fixed to the support pin 24 and the outer collar 33 at the time of manufacturing. In the case of this embodiment, the elastic component 29 is fixed to the support pin 24 and the outer collar 33 according to vulcanization adhesion. The elastic component 29 may be fixed to the support pin 24 and the outer collar 33 according to a means other than vulcanization adhesion which is, for example, an adhesive agent and the like.

The end surface of the large diameter cylinder part 29b is in contact with the lower surface (surface directed to the cover unit 6) of the head part 24b of the support pin 24, and the elastic component 29 is adhered to the lower surface according to vulcanization adhesion. The inner circumferential surface of the elastic component 29 faces the outer circumferential surface of the shaft part 24a of the support pin 24 with a predetermined gap. Accordingly, in the case of this embodiment, only the head part 24b of the support pin 24 is fixed to the elastic component 29, and the rest of the parts of the support pin 24 is in a non-contact state with the elastic component 29.

In the elastic component 29, the general cylinder part 29a is fitted into the inner circumferential surface of the small diameter cylinder part 33a of the outer collar 33, and the step surface 29c is butted to the step part 33c of the outer collar 33. Then, in this state, the general cylinder part 29a and the step surface 29c of the elastic component 29 is adhered to the small diameter cylinder part 33a and the step part 33c of the outer collar 33 according to vulcanization adhesion. The outer circumferential surface of the large diameter cylinder part 29b of the elastic component 29 is arranged on the inner side of the large diameter cylinder part 33b of the outer collar 33 with a predetermined gap. The head part 24b of the support pin 24 is formed to have substantially the same outer diameter as the large diameter cylinder part 29b of the elastic component 29, and a predetermined gap is secured between the large diameter cylinder part 33b of the outer collar 33 and the head part 24b of the support pin 24.

The elastic component 29 fixed to the support pin 24 and the outer collar 33 as described above is provided to extend at a region where at least the outer collar 33 and the shaft part 24a of the support pin 24 axially overlap with each other, and the outer collar 33 made of a resin and the shaft part 24a of the support pin 24 made of a metal do not directly face each other.

In the case of this embodiment, the connection unit 23 is attached in advance to the second retainer 17 of the horn block 13 in a state where the spring retainer 30 and the horn spring 25 are attached to the support pin 24. In this way, the front end part of the support pin 24 attached to the horn block 13 is inserted into the corresponding guide bush 47 and the support hole 35 on the cover 6 side. At this time, when the front end parts of the support pins 24 are inserted into the guide bush 47 and the support hole 35, one end of the horn spring 25 having the other end held by the support pin 24 comes into contact with the corresponding flange part 47a of the guide bush 47, and the horn spring 25 is gradually compressed as the support pin 24 is pressed.

In this way, when the support pin 24 is inserted into the guide bush 47 and the support hole 35, the taper part 32 on the front end side of the support pin 24 pushes and moves the locking member 36, and at the timing when the support pin 24 is inserted by a predetermined amount, the locking member 36 elastically returns and is inserted into the cutout groove 34 of the support pin 24. As a result, the horn block 13 is locked to be fixed to the steering wheel main body 4 via the connection unit 23.

In this embodiment, the horn block 13 and the elastic components 29 of the connection units 23 form the dynamic damper that attenuates vibration of the steering wheel 1. The vibration system formed of the horn block 13 and the elastic component 29 is tuned so as to resonate with vibration in a frequency range such as engine vibration or travel vibration input to the steering wheel 1.

Next, the operation of each unit when the horn block 13 is operated as a horn and when the horn block 13 functions as a dynamic damper is described.

When the steering pad 5 is pushed by the driver for the horn operation during driving of the vehicle or the like, a load in the press direction is input to the support pin 24 of the connection unit 23. In this way, when the operation load is input to the support pin 24, the horn spring 25 is compressively deformed, and the entire horn block 13 is pressed. At the timing when the horn block 13 is displaced by a set stroke or more, the horn contact points 26A, 26B come into contact with each other, and as a result, the horn is operated.

On the other hand, during the horn block 13 is not operated to be pressed, the outer collar 33 of the connection unit 23 fixed to the horn block 13 is supported in a displaceable manner by the end part of the support pin 24 via the elastic component 29. From this state, when engine vibration, travel vibration, or the like is input to the steering wheel 1, the vibration system in which the horn block 13 is a damper mass and the elastic component 29 is a spring resonates, and as a result, the vibration of the steering wheel 1 is attenuated.

As described above, in the steering wheel structure according to this embodiment, the rubbery elastic component 29 of the connection unit 23 is fixed to each of the outer collar 33 made of a resin and the support pin 24 made of a metal according to vulcanization adhesion or the like, and therefore, the vibration transmission loss inside the connection unit 23 is extremely low. Therefore, when the steering wheel structure according to this embodiment is employed, it is possible to set the property such as the attenuation frequency of the dynamic damper with high accuracy.

Further, in the steering wheel structure, the elastic component 29 of the connection unit 23 is not directly fixed to the second retainer 17 made of a metal of the horn block 13 but is fixed to the outer collar 33 made of a resin, and the outer collar 33 is locked to be fixed to the second retainer 17. Therefore, it is possible to prevent the elastic component 29 from coming into contact directly with the metal member and prevent the contacting end part from being degraded.

Further, in the steering wheel structure according to this embodiment, since the elastic component 29 of the connection unit 23 is fixed only to the head part 24b of the support pin 24, and a gap is secured between the elastic component 29 and the circumferential area of the shaft part 24a of the support pin 24, the elastic component 29 is easily elastically deformed further flexibly when the vehicle vibration is input. Accordingly, by employing this structure, it is possible to further improve the vibration attenuation performance of the dynamic damper.

Further, in the case of the steering wheel structure according to this embodiment, the elastic component 29 is provided to extend at a region where the outer collar 33 and the shaft part 24a of the support pin 24 axially overlap with each other, and therefore, even when the horn block 13 is strongly pressed diagonally when the horn is operated or the like, it is possible to prevent the outer collar 33 from coming into contact with the shaft part 24a of the support pin 24 and generating an abnormal sound.

Next, a second embodiment shown in FIG. 9 to FIG. 14 is described.

In the second embodiment, only the structure of a connection unit 123 is different from that of the first embodiment. The connection unit 123 according to the second embodiment includes a support pin 24 having one end part supported by the steering wheel main body, an outer collar 33 made of a resin and having an outer circumferential part attached to the horn block, and an elastic component 129 formed of a rubber, an elastic resin, or the like interposed between the outer collar 33 and the support pin 24 and fixed to the outer collar 33 and the support pin 24 according to vulcanization adhesion or the like. The shape of the elastic component 129 and the fixation part of the elastic component 129 and the support pin 24 of the connection unit 123 of this embodiment are different from those of the first embodiment.

The elastic component 129 has a circumferential wall part 129a fixed to the small diameter cylinder part 33a of the outer collar 33 and the inner circumferential surface of the step part 33c according to vulcanization adhesion or the like, four beam parts 129b provided to connect to one end part in the axis direction of the circumferential wall part 129a and extending inward and outward in the radial direction of the circumferential wall part 129a, and an inner circumferential wall part 129c connected to the inner extension ends in the radial direction of the four beam parts 129b and fixed to the outer circumferential surface of the shaft part 24a of the support pin 24 according to vulcanization adhesion or the like.

The entire region of the end surface of each beam part 129b on one end side in the axis direction of the elastic component 129 is fixed to the lower surface of the head part 24b of the support pin 24 according to vulcanization adhesion or the like. The end surface of each beam part 129b on the other end side in the axis direction of the more outer protrusion region in the radial direction than the circumferential wall part 129a is fixed to the step part 33c of the outer collar 33 according to vulcanization adhesion or the like. A supplemental beam part 129d that projects by a predetermined amount in the inward direction of the circumferential wall part 129a is formed integrally at the inner extension region in the radial direction of each beam part 129b. The inner end surface in the radial direction of each supplemental beam part 129d is fixed to the outer circumferential surface of the shaft part 24a of the support pin 24 according to vulcanization adhesion.

The four beam parts 129b of the elastic component 129 extend along the radial direction from the shaft center of the elastic component 129 as a center, and the adjacent beam parts 129b are separated from each other in the circumferential direction by 90°.

In the elastic component 129 of this embodiment, the outer collar 33 and the support pin 24 are connected mainly via the four beam parts 129b.

The elastic component 129 is provided to extend at least at a region where the outer collar 33 and the shaft part 24a of the support pin 24 axially overlap with each other.

Even in the case of this embodiment, since the elastic component 129 of the connection unit 123 is fixed to each of the outer collar 33 and the support pin 24 according to vulcanization adhesion or the like, the vibration transmission loss inside the connection unit 123 is extremely low, and it is possible to obtain an advantage substantially similar to the first embodiment.

Further, in the steering structure according to this embodiment, the elastic component 129 that forms the connection unit 123 has the circumferential wall part 129a fixed to the inner circumferential part of the outer collar 33 and the four beam parts 129b that radially extend from the circumferential wall part 129a to be fixed to the support pin 24. Therefore, around the circumferential wall part 129a of the elastic component 129, the vibration property such as the resonation frequency is changed between a section where the beam part 129b is present and a section where the beam part 129b is absent. Accordingly, when the connection unit 123 is arranged at the steering wheel main body 4 together with the horn block 13, by considering the arrangement and the extension direction of the beam part 129b of the elastic component 129, it is possible to obtain a property advantageous for attenuation corresponding to the input direction of vibration which is an attenuation target.

In a case where the property of the elastic component is changed in consideration of the input direction of vibration, for example, the rotation position around the shaft center at the time of installation of the elastic component 129 may be changed, or the extension direction of the beam part 129b or the number of the beam parts 129b may be changed at the time of manufacturing.

Further, in the steering structure according to this embodiment, the inner end parts in the radial direction of the plurality of the beam parts 129b of the elastic component 129 are connected to each other by the inner circumferential wall part 129c, and the inner circumferential wall part 129c is fixed to the outer circumferential surface of the shaft part 24a of the support pin 24. Therefore, by adopting this structure, the end parts of the plurality of the beam parts 129b of the elastic component 129 can be rigidly and stably fixed to the outer circumferential surface of the support pin 24.

Further, in the embodiment described above, the beam parts 129b are intermittently provided to extend around the shaft part 24a of the support pin 24. However, a plurality of beam parts may be provided to extend over the entire outer circumference of the shaft part 24a of the support pin 24.

Next, a third embodiment shown in FIG. 15 to FIG. 21 is described.

Figure 15:
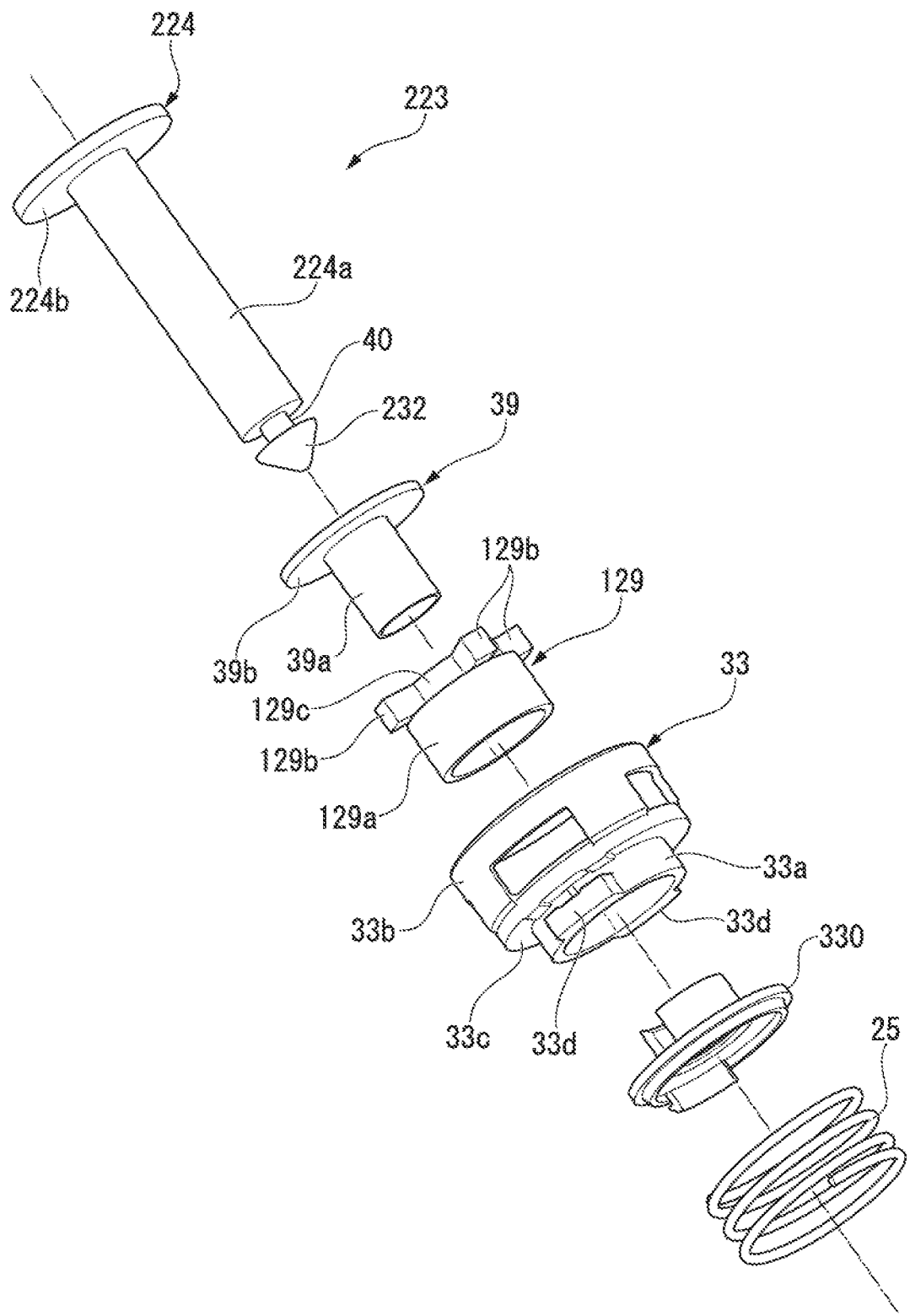
FIG. 15 is an exploded perspective view of a connection unit and an addition component according to a third embodiment of the present invention.
Figure 16:
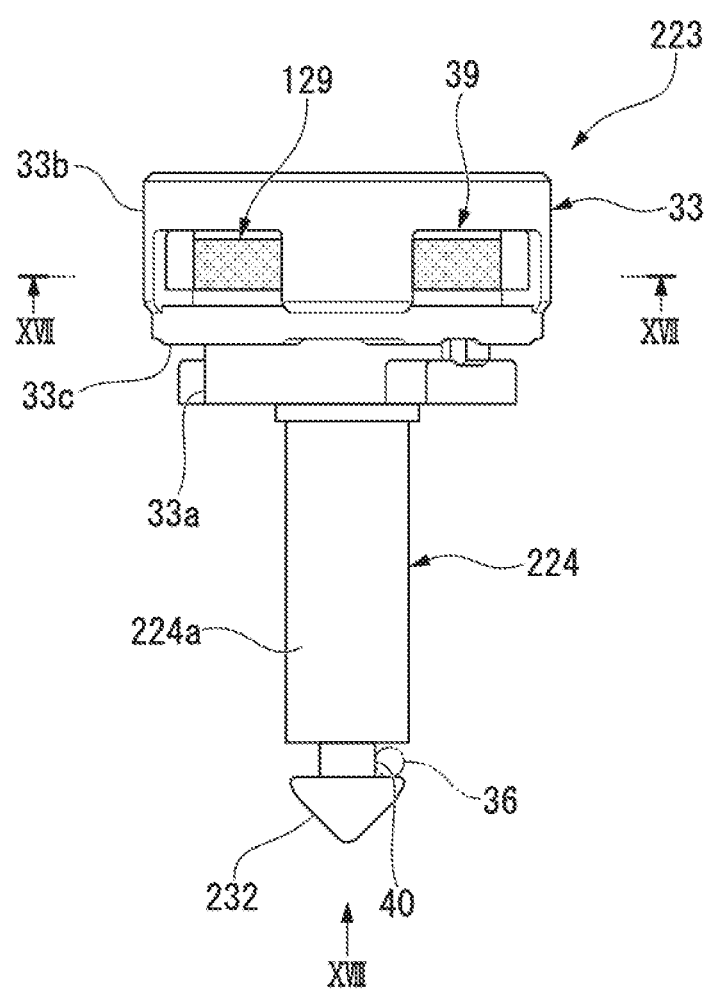
FIG. 16 is a side view of the connection unit according to the third embodiment of the present invention.
Figure 17:
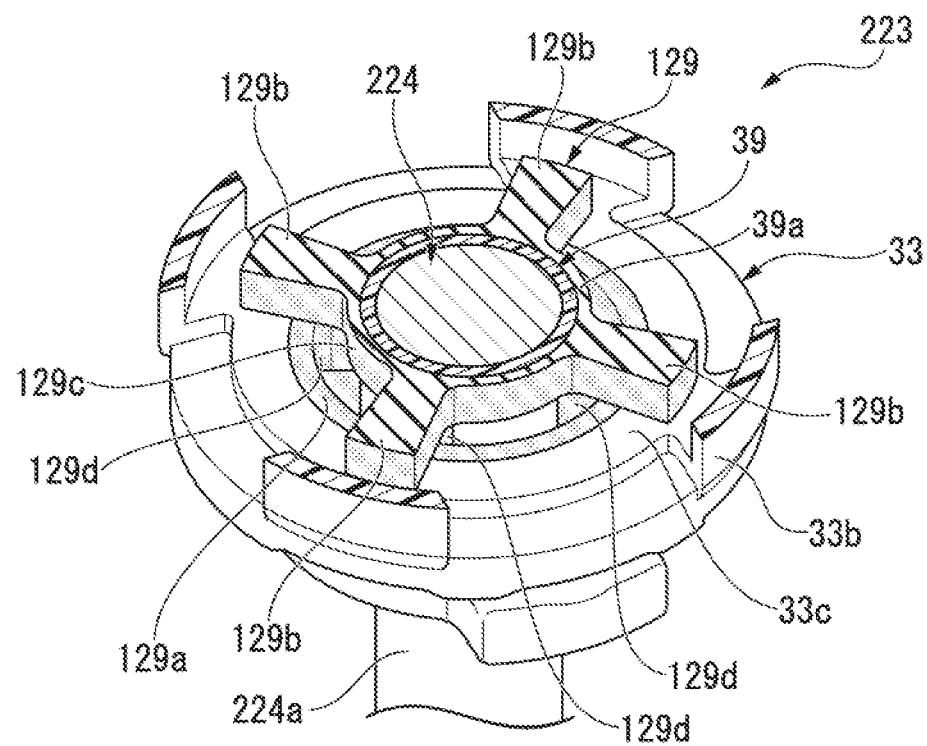
FIG. 17 is a perspective view broken at a XVII-XVII line of FIG. 16 of the connection unit according to the third embodiment of the present invention.
Figure 18:
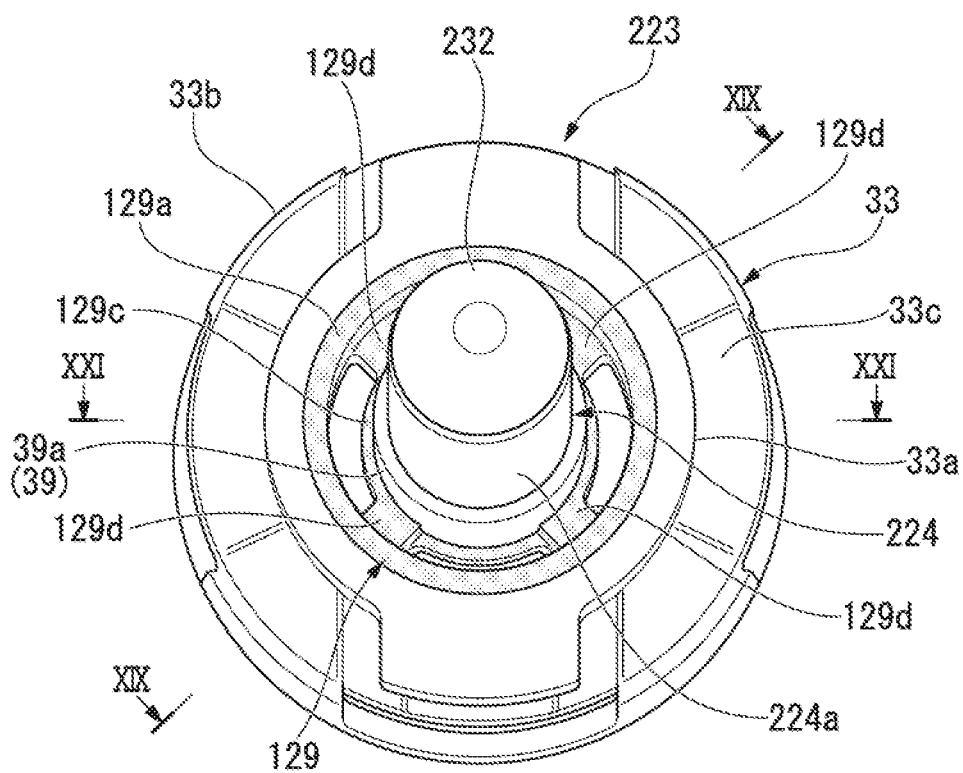
FIG. 18 is a XVIII arrow view of FIG. 16 of the connection unit according to the third embodiment of the present invention.
Figure 19:
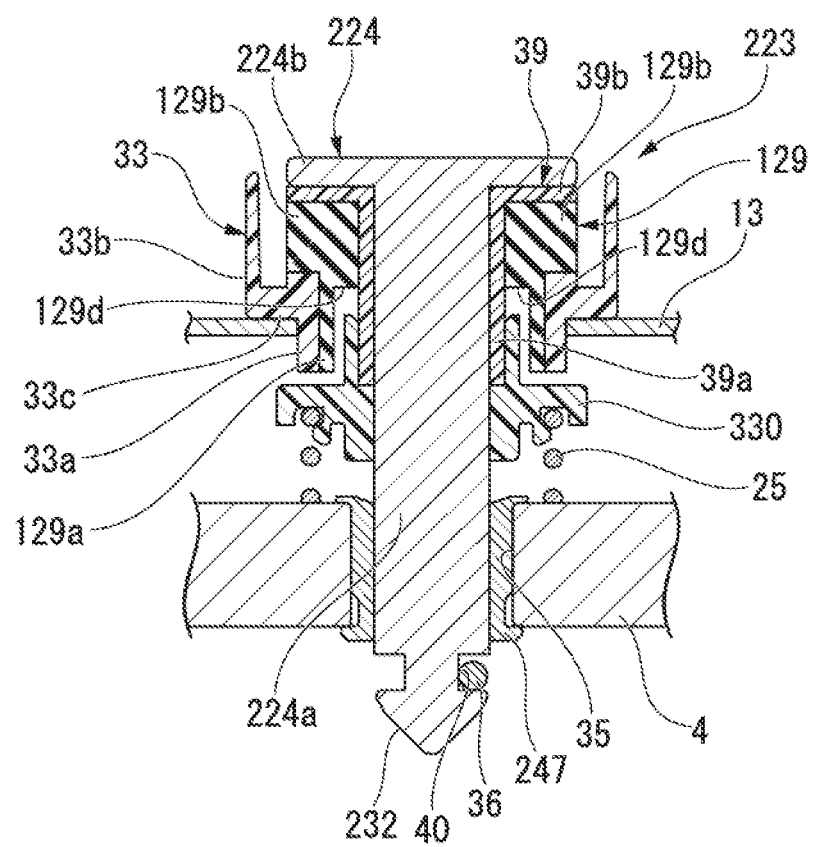
FIG. 19 is a cross-sectional view cut at a XIX-XIX line of FIG. 18 of the connection unit according to the third embodiment of the present invention.
Figure 20:
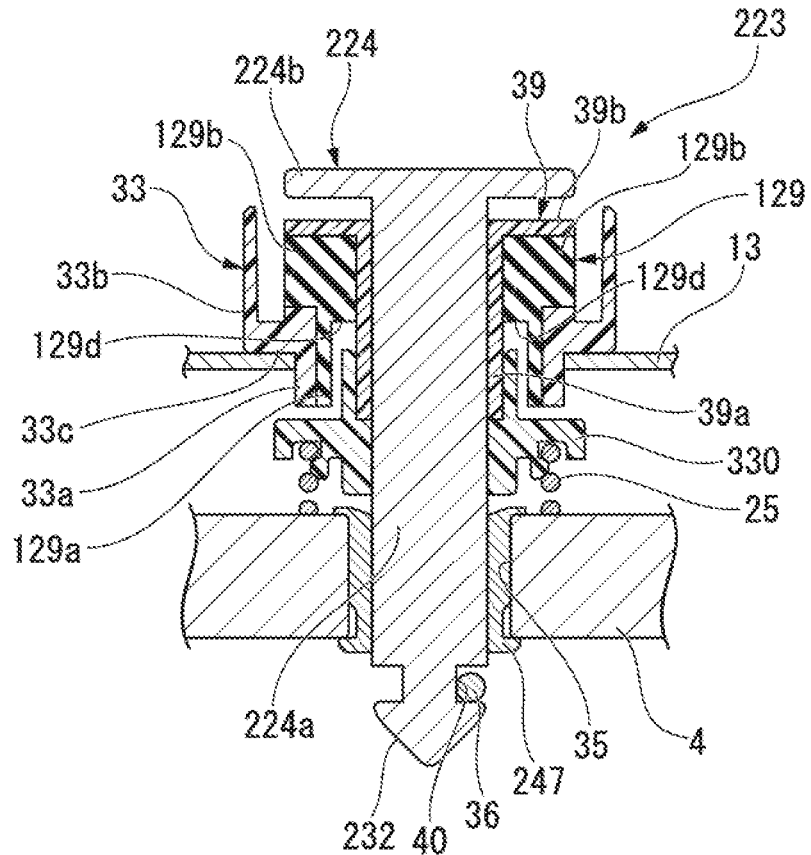
FIG. 20 is a cross-sectional view cut at the XIX-XIX line of FIG. 18 of the connection unit according to the third embodiment of the present invention.
Figure 21:
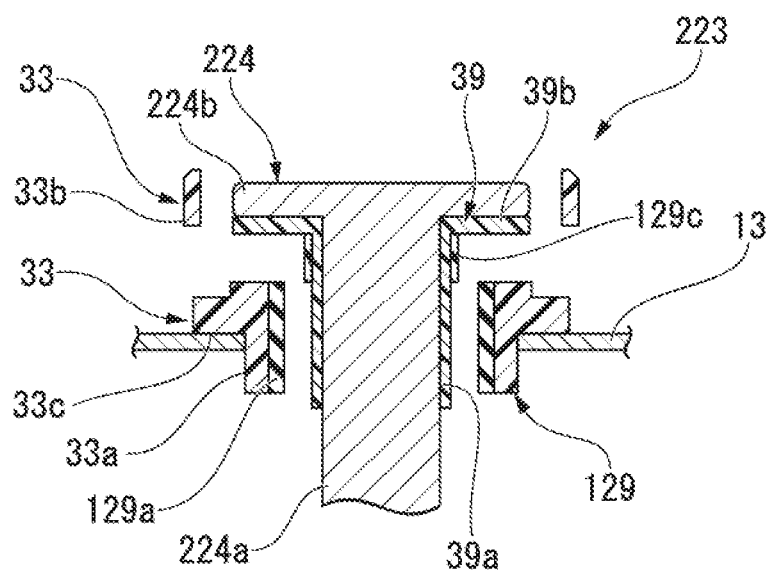
FIG. 21 is a cross-sectional view cut at a XXI-XXI line of FIG. 18 of the connection unit according to the third embodiment of the present invention.

FIG. 15 is an exploded perspective view of a connection unit 223 and an addition component, and FIG. 16 is a side view of the connection unit 223. FIG. 17 is a perspective view broken at part of the connection unit 223, FIG. 18 is a XVIII arrow view of FIG. 16 of the connection unit 223, and FIG. 19 to FIG. 21 are cross-sectional views of the connection unit 223.

In the third embodiment, only the structure of the connection unit 223 is different from those of the first embodiment and the second embodiment. The connection unit 223 according to the third embodiment includes a support pin 224 having one end part supported by the steering wheel main body 4, the outer collar 33 made of a resin and having an outer circumferential part attached to the horn block 13, and the elastic component 129 formed of a rubber, an elastic resin, or the like interposed between the outer collar 33 and the support pin 224. The connection unit 223 according to the third embodiment is different from those of the first embodiment and the second embodiment. One end part of the support pin 224 is fixed to the steering wheel main body 4 in a substantially non-displaceable manner, and the elastic component 129 is fixed not to the support pin 224 but to a guide component 39 in a separate body according to vulcanization adhesion or the like. The guide component 39 is formed of a resin in a cylinder shape and is slidably held by a shaft part 224a of the support pin 224.

In the connection unit 223 according to this embodiment, at the time of the horn operation of the horn block 13 or the like, the support pin 224 is not displaced, but the guide component 39 on the inner side is slid to be displaced on the shaft part 224a of the support pin 224.

As shown in FIG. 15, FIG. 19 to FIG. 21, the guide component 39 includes a cylinder part 39a that is slidably fitted to the shaft part 224a of the support pin 224 and a flange part 39b that projects radially outward from one end part (the same side as a head part 224b of the support pin 224) in the axis direction of the cylinder part 39a.

The elastic component 129 has a circumferential wall part 129a fixed according to vulcanization adhesion or the like to the inner circumferential surface of the small diameter cylinder part 33a of the outer collar 33, four beam parts 129b provided at one end part in the axis direction of the circumferential wall part 129a and extending inward and outward in the radial direction of the circumferential wall part 129a, and an inner circumferential wall part 129c connected to the inner extension ends in the radial direction of the four beam parts 129b and fixed to the outer circumferential surface of the cylinder part 39a of the guide component 39 according to vulcanization adhesion or the like.

The entire region of the end surface of each beam part 129b on one end side in the axis direction of the elastic component 129 is fixed to the rear surface of the flange part 39b of the guide component 39 according to vulcanization adhesion or the like. The end surface of each beam part 129b on the other end side in the axis direction of the more outer protrusion region in the radial direction than the circumferential wall part 129a is fixed to the step part 33c of the outer collar 33 according to vulcanization adhesion or the like. A supplemental beam part 129d that projects in the inward direction of the circumferential wall part 129a is formed integrally at the inner extension region in the radial direction of each beam part 129b. The inner end surface in the radial direction of each supplemental beam part 129d is fixed to the outer circumferential surface of the cylinder part 39a of the guide component 39 according to vulcanization adhesion.

The four beam parts 129b of the elastic component 129 extend along the radial direction from the shaft center of the elastic component 129 as a center and elastically connect the outer collar 33 and the support pin 224. The elastic component 129 is provided to extend at least at a region where the outer collar 33 and the shaft part 224a of the support pin 224 axially overlap with each other.

A taper part 232 having a decreased diameter toward the extension end to form a conical shape is formed at one end part in the axis direction of the support pin 224. A locking groove 40 having an annular shape is formed at a position adjacent to the taper part 232 of the shaft part of the support pin 224.

As shown in FIG. 19 and FIG. 20, the support hole 35 is formed on the steering wheel main body 4, and a bush 247 is attached to the support hole 35. One end part of the support pin 224 is inserted in the bush 247. A locking member 36 formed of a spring steel wire is arranged at a region facing the support hole 35 of the front surface (surface on the vehicle body front side) of the steering wheel main body 4, and the locking member 36 is engaged with spring elasticity to the locking groove 40 of the support pin 224 that penetrates through the support hole 35. In the case of this embodiment, the locking groove 40 is formed to have a slightly larger groove width than the outer diameter of the locking member 36. Therefore, when the locking member 36 is engaged with the locking groove 40, the displacement in the axis direction of the support pin 224 with respect to the steering wheel main body 4 is regulated.

A spring retainer 330 which is made of a resin and supports one end part of the horn spring 25 is fitted to the outer circumference on the front end side of the cylinder part 39a of the guide component 39 that is fixed to the elastic component 129 according to vulcanization adhesion. The spring retainer 330 is slidably held by the shaft part 224a of the support pin 224. The horn spring 25 is interposed between the spring retainer 330 and the rear surface (surface on the vehicle body rear side) of the steering wheel main body 4 and biases the horn block 13 in the initial position direction via the spring retainer 330, the guide component 39, the elastic component 129, and the outer collar 33.

In the case of this embodiment, when the steering pad is pushed by the driver for the horn operation during driving of the vehicle or the like, a load in the press direction is input to the spring retainer 330 via the elastic component 129 and the guide component 39 from the outer collar 33 of the connection unit 223. In this way, when the operation load is input to the spring retainer 330, as shown in FIG. 20, the horn spring 25 is compressively deformed, and the entire horn block 13 is pressed. In this way, when the horn block 13 is displaced by a set stroke or more, horn contact points come into contact with each other, and thereby, the horn is operated.

When the horn block 13 is not operated, and when engine vibration, travel vibration, or the like is input to the steering wheel, the vibration system in which the horn block 13 is a damper mass and the elastic component 129 is a spring resonates, and the vibration of the steering wheel is attenuated.

In the steering wheel structure according to this embodiment, the elastic component 129 of the connection unit 223 is fixed to each of the outer collar 33 and the guide component 39 according to vulcanization adhesion or the like, and therefore, it is possible to reduce the vibration transmission loss inside the connection unit 223. Therefore, even in the case of this embodiment, it is possible to set the property such as the attenuation frequency of the dynamic damper with high accuracy.

Further, in the steering structure according to this embodiment, the elastic component 129 of the connection unit 223 includes the circumferential wall part 129a fixed to the inner circumferential part of the outer collar 33 and the four beam parts 129b that radially extend from the circumferential wall part 129a to be fixed to the guide component 39. Therefore, when the connection unit 223 is arranged at the steering wheel main body 4 together with the horn block 13, by considering the arrangement and the extension direction of the beam part 129b of the elastic component 129, it is possible to easily obtain a property advantageous for attenuation corresponding to the input direction of vibration which is an attenuation target.

Further, in the steering structure according to this embodiment, the inner end parts in the radial direction of the plurality of the beam parts 129b of the elastic component 129 are connected to each other by the inner circumferential wall part 129c, and the inner circumferential wall part 129c is fixed to the outer circumferential surface of the cylinder part 39a of the guide component 39. Therefore, the end parts of the plurality of the beam parts 129b of the elastic component 129 can be rigidly and stably fixed to the outer circumferential surface of the guide component 39.

Figure 22:
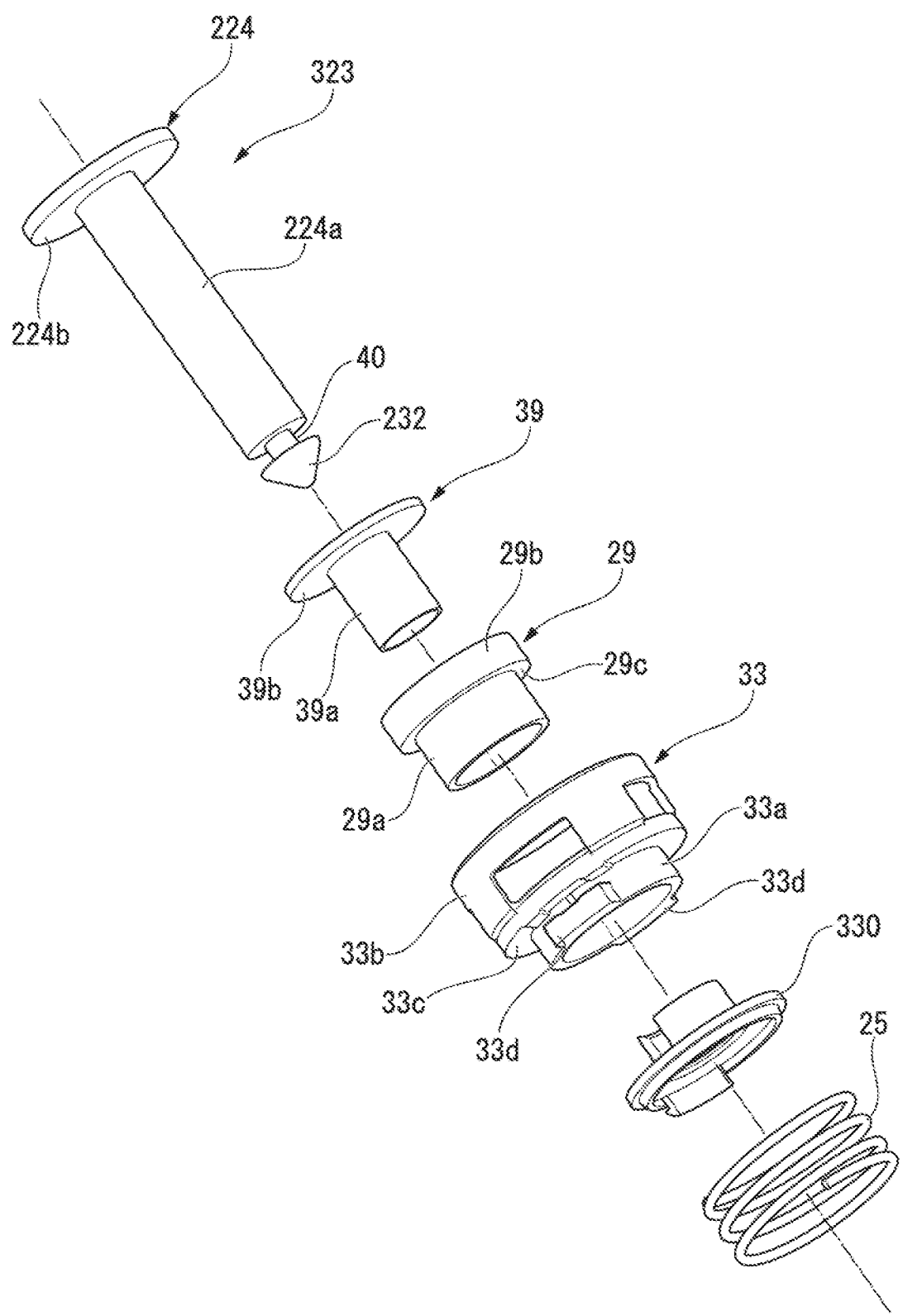
FIG. 22 is an exploded perspective view of a connection unit and an addition component according to a fourth embodiment of the present invention.
Figure 23:
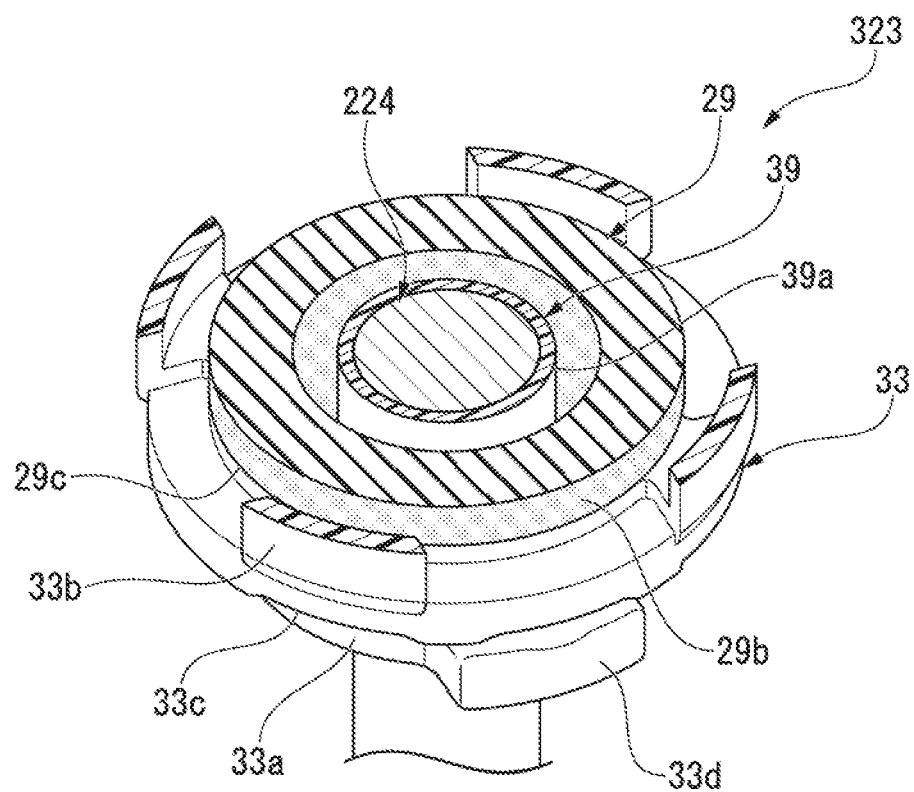
FIG. 23 is a partially broken perspective view corresponding to FIG. 17 of the third embodiment of the connection unit according to the fourth embodiment of the present invention.
Figure 24:
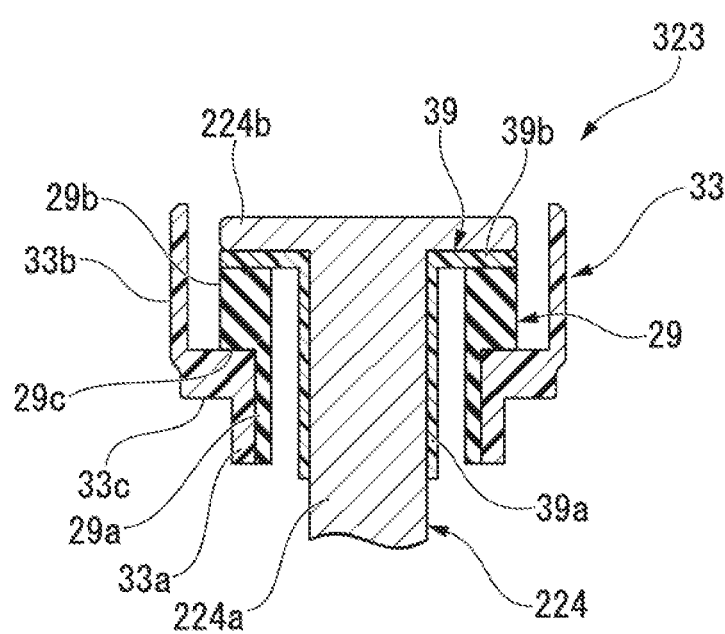
FIG. 24 is a cross-sectional view corresponding to FIG. 19 of the third embodiment of the connection unit according to the fourth embodiment of the present invention.

FIG. 22 to FIG. 24 are views showing a fourth embodiment. FIG. 22 is an exploded perspective view of a connection unit 323 and an addition component according to the fourth embodiment, FIG. 23 is a partially broken perspective view of the connection unit 323, and FIG. 24 is a cross-sectional view of the connection unit 323.

The shape of the elastic component 29 and the fixation part of the elastic component 29 and the support pin 224 of the connection unit 323 according to the fourth embodiment are different from those of the third embodiment, and the rest of configurations are the same as those of the third embodiment. Similarly to that of the first embodiment, the elastic component 29 is formed such that the entire shape is a cylinder shape, a large diameter cylinder part 29b having a larger outer diameter than that of a general cylinder part 29a is provided to continue to one end part in the axis direction of the general cylinder part 29a having a constant outer diameter, and a step surface 29c is provided between the outer circumferential surfaces of the general cylinder part 29a and the large diameter cylinder part 29b. In the elastic component 29, the end surface of the large diameter cylinder part 29b is fixed to the lower surface of the flange part 39b of the guide component 39 according to vulcanization adhesion or the like, and the general cylinder part 29a and the step surface 29c are fixed to the small diameter cylinder part 33a and the step part 33c of the outer collar 33 according to vulcanization adhesion or the like. Accordingly, the elastic component 29 is fixed to the flange part 39b in a non-contact state with the cylinder part 39a of the guide component 39.

Even in the case of the fourth embodiment, it is possible to obtain a basic action and advantage similar to the third embodiment described above.

Further, in the fourth embodiment, since the elastic component 29 of the connection unit 323 is fixed only to the flange part 39b of the guide component 39, and a gap is secured between the elastic component 29 and the circumferential area of the shaft part 39a of the guide component 39, the elastic component 29 is easily elastically deformed further flexibly when the vehicle vibration is input. Accordingly, by employing this structure, it is possible to further improve the vibration attenuation performance of the dynamic damper.

Next, a fifth embodiment shown in FIG. 25 to FIG. 29 is described.

Figure 25:
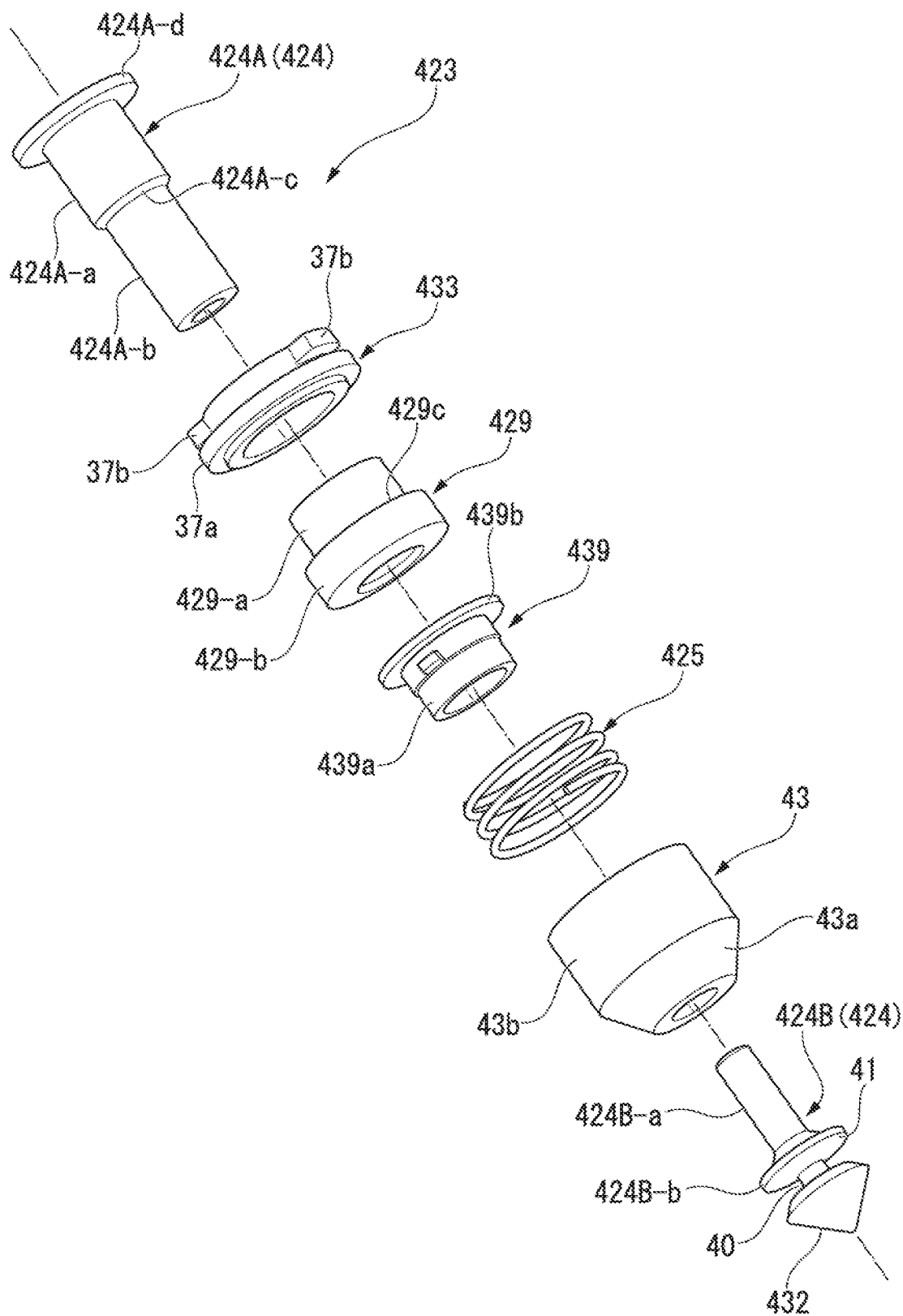
FIG. 25 is an exploded perspective view of a connection unit and an addition component according to a fifth embodiment of the present invention.
Figure 26:
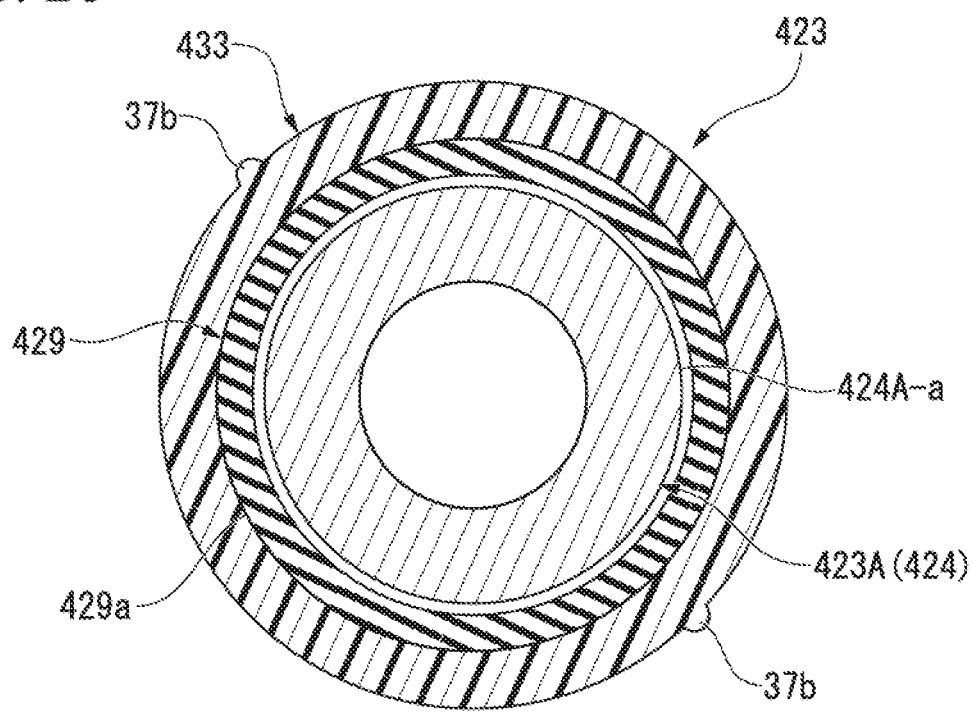
FIG. 26 is a cross-sectional view cut at a XXVI-XXVI line of FIG. 28 of the connection unit according to the fifth embodiment of the present invention.
Figure 27:
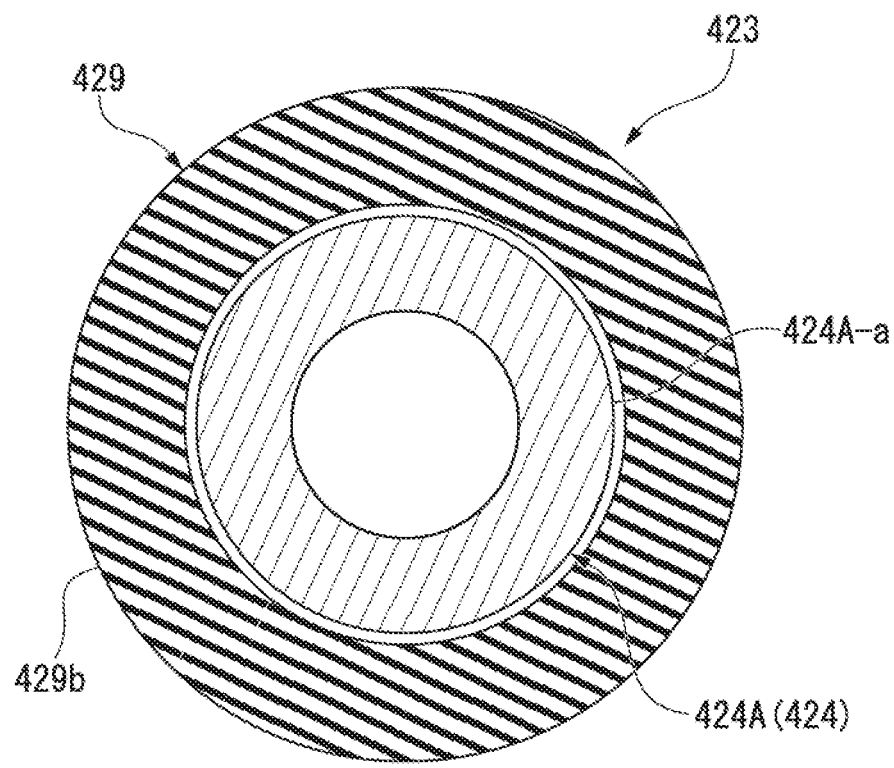
FIG. 27 is a cross-sectional view cut at a XXVII-XXVII line of FIG. 28 of the connection unit according to the fifth embodiment of the present invention.

FIG. 25 is an exploded perspective view of a connection unit 423 and an addition component according to a fifth embodiment, and FIG. 26 to FIG. 29 are cross-sectional views of the connection unit 423.

In the fifth embodiment, the structure of the connection unit 423 is different from that of the first to fourth embodiments. The connection unit 423 according to the fifth embodiment includes a support pin 424 having one end part fixed to the steering wheel main body 4 in a substantially non-displaceable manner, an outer collar 433 (cylinder component) made of a resin and having an outer circumferential part attached to the horn block 13, and a guide component 439 slidably held by the support pin 424, and an elastic component 429 interposed between the outer collar 433 and the guide component 439 and fixed to each of the outer collar 433 and the guide component 439 according to vulcanization adhesion or the like. The elastic component 429 forms a spring of a dynamic damper in which the horn block 13 is a damper mass.

The support pin 424 is formed of a first pin member 424A arranged on the horn block 13 side and a second pin member 424B arranged on the steering wheel main body 4 side, and the first pin member 424A and the second pin member 424B are concentrically connected to each other. The first pin member 424A and the second pin member 424B are formed of a metal such as a stainless steel or a hard resin.

The first pin member 424A is formed such that the entire shape is a substantially cylinder shape. The first pin member 424A includes a large diameter shaft part 424A-a, a small diameter shaft part 424A-b having a smaller outer diameter than the large diameter shaft part 424A-a, a regulation part 424A-c formed of a step surface having a taper shape between the large diameter shaft part 424A-a and the small diameter shaft part 424A-b, and a head part 424A-d formed, so as to project outward in the radial direction, at the end part on the opposite side of the regulation part 424A-c of the large diameter shaft part 424A-a.

The second pin member 424B includes a press fit shaft part 424B-a that is pressed into the inner circumference of the small diameter shaft part 424A-b of the first pin member 424A and a base part-side shaft part 424B-b that protrudes axially outward from the small diameter shaft part 424A-b when the press fit shaft part 424B-a is pressed into the small diameter shaft part 424A-b. The base part-side shaft part 424B-b has a stopper flange 41 having a decreased diameter in a two-step manner toward the small diameter shaft part 424A-b and a taper part 432 having a conical shape and continuously provided to interpose the locking groove 40 having an annular shape on the outer side in the axis direction of the stopper flange 41.

Figure 28:
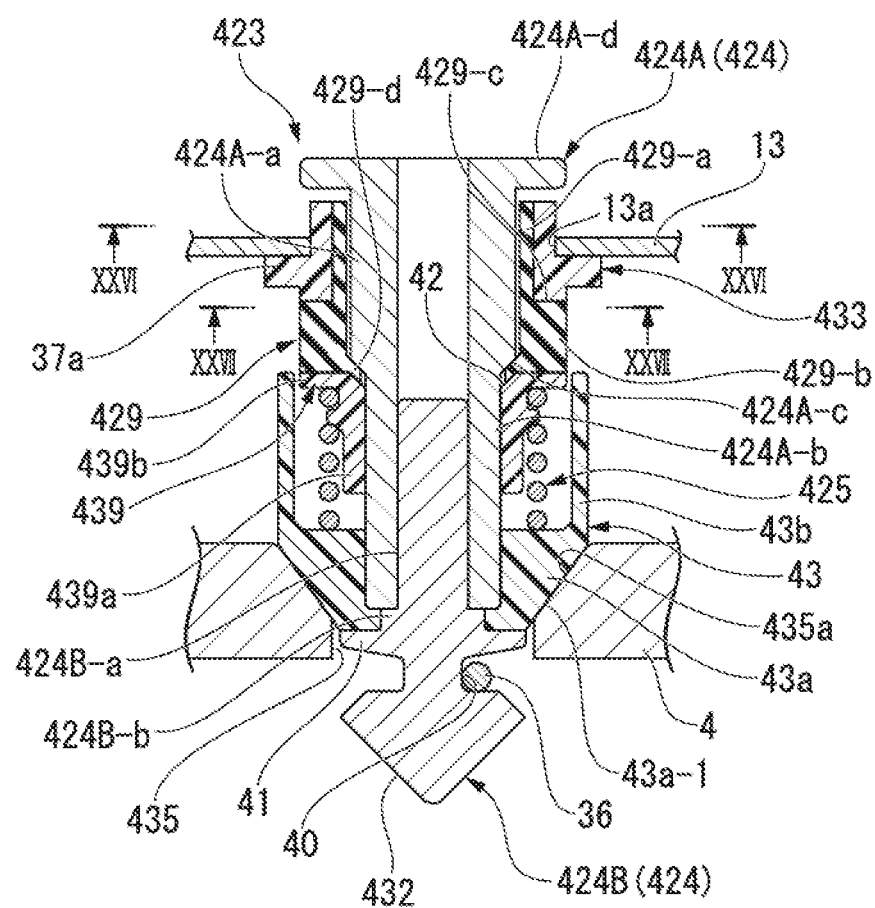
FIG. 28 is a longitudinal cross-sectional view of the connection unit according to the fifth embodiment of the present invention.
Figure 29:
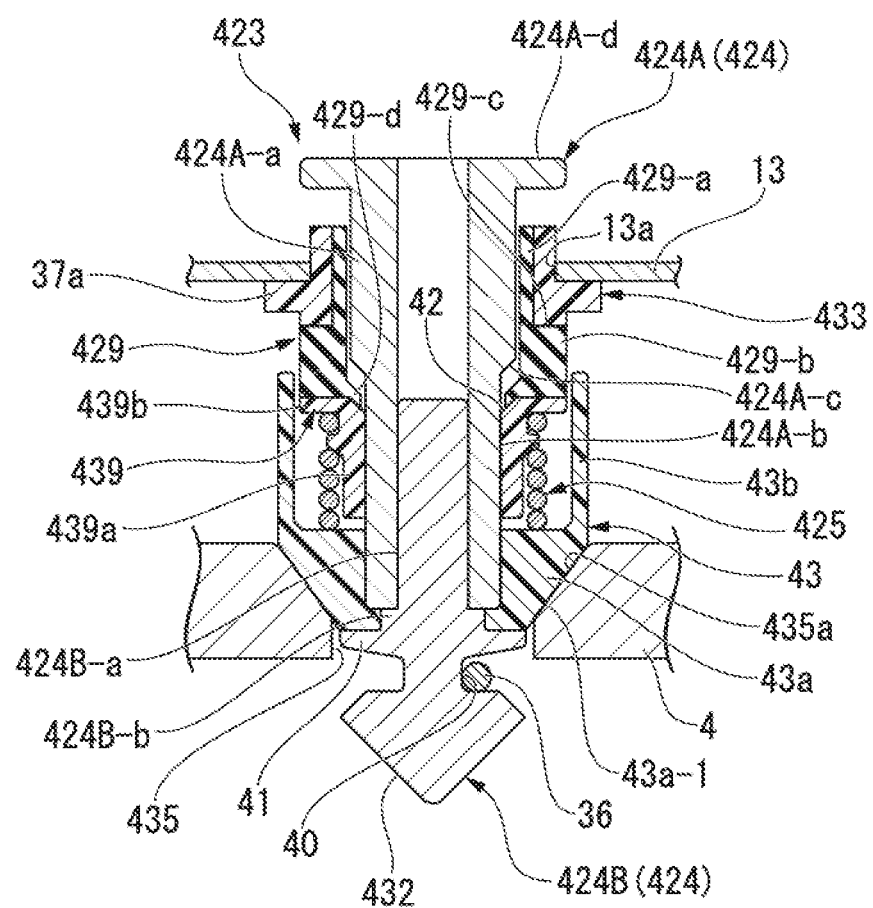
FIG. 29 is a longitudinal cross-sectional view of the connection unit according to the fifth embodiment of the present invention.

As shown in FIG. 28 and FIG. 29, the second pin member 424B integrally connected to the first pin member 424A according to press fitting is inserted in a support hole 435 formed on the steering wheel main body 4. The locking member 36 provided on the front surface (surface on the vehicle body front side) side of the steering wheel main body 4 is engaged with the locking groove 40, and thereby, the second pin member 424B inserted in the support hole 435 is fixed to the steering wheel main body 4.

The outer collar 433 is formed such that the entire shape is a substantially cylinder shape. The outer collar 433 has an outer circumferential part attached to an attachment hole 13a of the horn block 13. Specifically, locking flanges 37a, 37b are provided to protrude at the outer circumferential surface of the outer collar 433 so as to be separated from each other in the axis direction. The edge part of the attachment hole 13a is sandwiched by the locking flanges 37a, 37b, and thereby, the outer collar 433 is attached to the horn block 13.

The guide component 439 has a cylinder part 439a slidably held by the outer circumferential surface of the small diameter shaft part 424A-b of the first pin member 424A and a load reception flange part 439b that projects outward in the radial direction from one end part in the axis direction on the horn block 13 side of the cylinder part 439a. One end part in the axis direction of a horn spring 425 (bias spring) is externally provided and is locked on the outer circumference of the cylinder part 439a. One end part of the horn spring 425 is in contact with the rear surface (second surface) of the load reception flange part 439b. The horn spring 425 biases the horn block 13 toward the initial position direction via the guide component 439, the elastic component 429, and the outer collar 433.

A recess part 42 having a taper shape is formed on the inner circumferential edge part of the front surface (first surface) of the load reception flange part 439*b*. As described below in detail, part of the elastic component 429 is fixed to the recess part 42. The recess part 42 of the load reception flange part 439*b* is provided at a region which the regulation part 424A-c of the first pin member 424A faces in the axis direction.

The elastic component 429 is formed such that the entire shape is a substantially cylinder shape. A large diameter cylinder part 429-*b* having a larger outer diameter than that of a general cylinder part 429-*a* is provided to continue to one end part in the axis direction of the general cylinder part 429-*a* having a constant outer diameter. A step surface 429-*c* is provided between the general cylinder part 429-*a* and the large diameter cylinder part 429-*b*. The entire region in the axis direction of the inner circumferential surface of the elastic component 429 excluding the extension end side of the large diameter cylinder part 429-*b* is formed to have a constant inner diameter. A thin extension part 429-*d* that extends in a circular ring shape toward the inside in the radial direction is formed on the extension end side of the large diameter cylinder part 429-*b* of the elastic component 429.

In the elastic component 429, the outer circumferential surface of the general cylinder part 429-*a* close to one end in the axis direction is fixed to the inner circumferential surface of the outer collar 433 according to vulcanization adhesion or the like, and the step surface 429-*c* is fixed to one end surface in the axis direction of the outer collar 433 according to vulcanization adhesion or the like. On the other hand, the other end surface in the axis direction on the opposite side of the general cylinder part 429-*a* of the elastic component 429 is fixed to the outer surface of the load reception flange part 439*b* of the guide component 439 according to vulcanization adhesion or the like. The extension part 429-*d* of the elastic component 429 is fixed to the recess part 42 of the load reception flange part 439*b* according to vulcanization adhesion or the like.

A gap is provided between the inner circumferential surface of the elastic component 429 and the large diameter shaft part 424A-a of the first pin member 424A at the entire region of the inner circumferential surface of the elastic component 429 excluding the extension part 429-*d*.

A contact member 43 made of a resin and in contact with a surface (surface on the vehicle interior side) on the rear side of the steering wheel main body 4 is attached to a part between the extension end part of the small diameter shaft part 424A-b of the first pin member 424A and the stopper flange 41 of the second pin member 424B. The contact member 43 has a head part 43*a* having a truncated conical shape and a cylinder wall 43*b* provided to connect to the outer circumference part on the large diameter side of the head part 43*a*. A surface facing the horn block 13 of the head part 43*a* is formed to be flat, and the flat surface is a support surface that supports the other end of the horn spring 425. The cylinder wall 43*b* surrounds the horn spring 425 interposed between the head part 43*a* and the load reception flange part 439*b* of the guide component 439 and the outer circumferential side part of the guide component 439.

A recess surface 435*a* having a taper shape is provided at a part facing the horn block 13 of the support hole 435 of the steering wheel main body 4. The outer surface of the head part 43*a* of the contact member 43 is a taper part 43*a*-1 having an outer diameter narrowed toward the extension direction. The taper part 43*a*-1 of the contact member 43 is in contact with the recess surface 435*a* of the support hole 435 of the steering wheel main body 4.

In the connection unit 423, in a state where the outer collar 433, the elastic component 429, and the guide component 439 that are mutually fixed are externally provided on the large diameter shaft part 424A-a of the first pin member 424A, and the horn spring 425 is interposed between the load reception flange part 439*b* of the guide component 439 and the contact member 43, the contact member 43 is attached to the small diameter shaft part 424A-b of the first pin member 424A. In this state, in the connection unit 423, the press fit shaft part 424B-a of the second pin member 424B is fixed according to press fitting to the small diameter shaft part 424A-b of the first pin member 424A. As a result, the contact member 43 is fixed to one end part of the support pin 424 in a state where the contact member 43 is sandwiched by the first pin member 424A and the second pin member 424B. The outer collar 433 part of the subassembly formed in this way is attached to the horn block 13.

The extension end of the support pin 424 attached to the horn block 13 and the taper part 43*a*-1 of the contact member 43 are inserted into the support hole 435 on the steering wheel main body 4 side. At this time, the taper part 43*a*-1 of the contact member 43 is pressed to the recess surface 435*a* having a taper shape of the support hole 435, and the horn spring 425 is gradually compressed as the insertion of the support pin 424 proceeds.

In this way, when the support pin 424 is inserted into the support hole 435, the taper part 432 of the support pin 424 pushes and moves the locking member 36, and at the timing when the support pin 424 is inserted by a predetermined amount, the locking member 36 elastically returns and is engaged with the inside of the locking groove 40 of the support pin 424. As a result, the horn block 13 is locked to be fixed to the steering wheel main body 4 via the connection unit 423.

In this embodiment, when the steering pad is pushed by the driver for the horn operation during driving of the vehicle or the like, an operation load is input to the horn spring 425 via the elastic component 429 and the guide component 439 from the outer collar 433 of the connection unit 423. In this way, when the operation load is input to the horn spring 425, as shown in FIG. 29, the horn spring 425 is compressively deformed to press the entire horn block 13, and at the timing when the horn spring 425 is displaced by a set stroke or more, the horn is operated.

From this state, when the press operation of the steering pad is released, the entire horn block 13 is displaced in the initial position direction according to the elasticity of the horn spring 425. At this time, when the guide component 439 of the connection unit 423 is displaced in the initial position direction by a predetermined amount, the recess part 42 of the guide component 439 comes into contact with the regulation part 424A-c of the support pin 424 via the extension part 429-*d* of the elastic component 429. Thereby, excess displacement in the initial position direction of the guide component 439 and the horn block 13 is regulated.

On the other hand, in a state where the horn block 13 is not operated, when engine vibration, travel vibration, or the like is input to the steering wheel, the vibration system in which the horn block 13 is a damper mass and the elastic component 429 is a spring resonates, and the vibration of the steering wheel is attenuated.

In the case of the steering wheel structure according to the fifth embodiment, the elastic component 429 of the connection unit 423 is fixed to each of the outer collar 433 and the guide component 439 according to vulcanization adhesion or the like, and therefore, the vibration transmission loss inside the connection unit 423 is reduced. Therefore, similarly to the first to fourth embodiments, it is possible to set the property such as the attenuation frequency of the dynamic damper with high accuracy.

Further, in the steering wheel structure according to this embodiment, the load reception flange part 439b to which the elastic component 429 is fixed is provided on the guide component 439 held by the support pin 424, and the extension part 429-d of the elastic component 429 is fixed to the recess surface 435a part that faces the regulation part 424A-c on the support pin 424 side of the load reception flange part 439b. Therefore, the load reception flange part 439b of the guide component 439 is always in contact with the regulation part 424A-c on the support pin 424 via the extension part 429-d of the elastic component 429. Accordingly, an impact or a contact sound when the displacement of the guide component 439 is regulated by the regulation part 424A-c is absorbed by the extension part 429-d. Accordingly, by adopting this configuration, it is possible to suppress a noise or vibration generated when the displacement of the guide component 439 is regulated by the regulation part 424A-c.

Specifically, in this embodiment, the regulation part 424A-c on the support pin 424 side is formed of a step surface having a taper shape, and the extension part 429-d of the elastic component 429 is fixed to the recess part 42 having a taper shape on the guide component 439 side. Therefore, by employing this structure, the impact when the displacement of the guide component 439 is regulated by the regulation part 424A-c is efficiently absorbed by the extension part 429-d arranged between the taper parts, and it is possible to suppress vibration or noise even with a small volume of the elastic component 429 (extension part 429-d).

Further, in the steering wheel structure according to this embodiment, the contact member 43 is attached to the support pin 424, and the taper part 43a-1 that comes into contact with the recess surface 435a of the support hole 435 on the steering wheel main body 4 side when the support pin 434 is fixed to the steering wheel main body 4 is provided on the contact member 43. Therefore, by causing the taper part 43a-1 of the contact member 43 to come into contact with the recess surface 435a of the support hole 435, the support pin 434 can be always accurately positioned with respect to the steering wheel main body 4. Accordingly, not only the support pin 434 can be easily and accurately positioned with respect to the steering wheel main body 4 at the time of the attachment, but even when the support pin 434 receives an external force and is slightly fluctuated in the axis direction and the radial direction at the time of a horn operation or the like, the taper part 43a-1 of the contact member 43 comes into contact with the recess surface 435a of the support hole 435, and thereby, it is possible to cause the support pin 434 to automatically return to the original appropriate position. The configuration of this embodiment can be applied also to the third embodiment and the fourth embodiment.

The invention is not limited to the embodiments described above, and a variety of design modifications can be made to the embodiments without departing from the scope of the invention. For example, in the first embodiment, a plurality of beam parts are not provided on the elastic component 29; however, a plurality of beam parts may be provided in place of the large diameter cylinder part 29b of the elastic component 29. In this case, by allowing the inner extension end in the radial direction of each beam part to be in non-contact with the shaft part of the support pin, it is possible to maintain advantages similar to the first embodiment as is.

Further, in the first and second embodiments, one end part of the support pin is locked to the steering wheel main body side, and the other end part of the support pin is attached to the horn block side via the elastic component and the cylinder component made of a resin; however, conversely, one end part of the support pin may be locked to the horn block side, and the other end part of the support pin may be attached to the steering wheel main body side via the elastic component and the cylinder component made of a resin.

Similarly, in the third to fifth embodiments, one end part of the support pin is locked to the steering wheel main body side, and the guide component slidably held by the support pin is connected to the horn block side via the elastic component and the outer collar which is a cylinder member; however, conversely, one end part of the support pin may be locked to the horn block side, and the guide component slidably held by the support pin may be connected to the steering wheel main body side via the elastic component and the outer collar.

Further, in the embodiments described above, the elastic component is fixed not only to the outer collar which is a cylinder component but also to the support pin or the guide component; however, the elastic member may be fixed only to the cylinder component. Specifically, in the fifth embodiment, the elastic member and the guide component may be pressed to be in contact with each other in use.

DESCRIPTION OF THE REFERENCE SYMBOLS

1: STEERING WHEEL
3: STEERING SHAFT
4: STEERING WHEEL MAIN BODY
13: HORN BLOCK
23, 123, 223, 323, 423: CONNECTION UNIT
24, 224, 424: SUPPORT PIN
24a, 224a: SHAFT PART
24b: HEAD PART
29, 129, 429: ELASTIC COMPONENT
33: OUTER COLLAR (CYLINDER COMPONENT)
39, 439: GUIDE COMPONENT
39a: CYLINDER PART
39b: FLANGE PART
43a-1: TAPER PART
129a: CIRCUMFERENTIAL WALL PART
129b: BEAM PART
129c: INNER CIRCUMFERENTIAL WALL PART
424A-c: REGULATION PART
425: HORN SPRING (BIAS SPRING)
429-d: EXTENSION PART
439b: LOAD RECEPTION FLANGE PART

The invention claimed is:
1. A steering wheel structure, comprising:
a steering wheel main body supported by a steering shaft;
a horn block to which a horn operation unit and an air-bag module are attached; and
a connection unit that connects the horn block to the steering wheel main body such that the horn block can be elastically displaced with respect to the steering wheel main body, wherein
the connection unit comprises
a support pin having one end supported by any one of the horn block and the steering wheel main body, a cylinder component having an outer circumferential part attached to the other of the horn block and the steering wheel main body, and an elastic component arranged between the cylinder component and the support pin, the elastic component is fixed to the cylinder component and the support pin, the support pin has a shaft part and a head part provided at one end of the shaft part and having a larger diameter than the shaft part, the elastic component is fixed to the head part in a non-contact state with the shaft part of the support pin, the elastic component comprises: a general cylinder part; a large diameter cylinder part having a larger outer diameter than an outer diameter of the general cylinder part; and a step surface that is provided between outer circumferential surfaces of the general cylinder part and the large diameter cylinder part, the cylinder component is provided so as to cover the elastic component from the large diameter cylinder part to the general cylinder part, and the elastic component is disposed in a region where the cylinder component and the shaft part of the support pin overlap with each other when seen from a radial direction of the support pin.

2. The steering wheel structure according to claim 1, wherein the cylinder component is configured to cover the elastic component from the outer circumferential surface of the large diameter cylinder part to the outer circumferential surface of the general cylinder part.

\* \* \* \* \*